United States Patent
Jung et al.

(10) Patent No.: US 12,507,134 B2
(45) Date of Patent: Dec. 23, 2025

(54) APPARATUS AND METHOD FOR CELL RESELECTION IN WIRELESS COMMUNICATION SYSTEM

(71) Applicant: Samsung Electronics Co., Ltd., Suwon-si (KR)

(72) Inventors: Sangyeob Jung, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/880,030

(22) Filed: Aug. 3, 2022

(65) Prior Publication Data
US 2023/0055788 A1  Feb. 23, 2023

(30) Foreign Application Priority Data

Aug. 5, 2021 (KR) .................. 10-2021-0103360
Aug. 10, 2021 (KR) .................. 10-2021-0105704

(51) Int. Cl.
  *H04W 36/00* (2009.01)
  *H04W 76/30* (2018.01)

(52) U.S. Cl.
  CPC ....... *H04W 36/0061* (2013.01); *H04W 76/30* (2018.02)

(58) Field of Classification Search
  CPC .................. H04W 36/0061; H04W 76/30
  See application file for complete search history.

(56) References Cited

U.S. PATENT DOCUMENTS

| | | | |
|---|---|---|---|
| 10,111,261 B2* | 10/2018 | Jung | H04W 72/044 |
| 2022/0346002 A1* | 10/2022 | Fu | H04W 48/20 |
| 2023/0055788 A1* | 2/2023 | Jung | H04W 36/0061 |
| 2023/0209521 A1* | 6/2023 | Fu | H04W 28/0268 |
| | | | 370/329 |
| 2023/0239774 A1* | 7/2023 | Fu | H04W 48/16 |
| | | | 370/329 |
| 2023/0308363 A1* | 9/2023 | Ishii | H04W 48/18 |
| 2023/0371011 A1* | 11/2023 | Fu | H04W 48/20 |
| 2024/0121710 A1* | 4/2024 | Cheng | H04W 48/18 |

FOREIGN PATENT DOCUMENTS

| | | |
|---|---|---|
| EP | 3589016 A1 | 1/2020 |
| WO | 2021/142576 A1 | 7/2021 |

OTHER PUBLICATIONS

ETSI MCC; Report of 3GPP TSG RAN WG2 meeting #113bis-e, Online; 3GPP TSG-RAN WG2 meeting #114-e; R2-2106641; Apr. 20, 2021.
ETSI MCC; Report of 3GPP TSG RAN WG2 meeting #114-e, Online; 3GPP TSG-RAN WG2 meeting #115-e; R2-2106901; May 27, 2021.

(Continued)

*Primary Examiner* — Parth Patel
(74) *Attorney, Agent, or Firm* — Jefferson IP Law, LLP

(57) ABSTRACT

A method performed by a base station (BS) is provided. The method includes transmitting system information including network slice related information, receiving, from a user equipment (UE), a radio resource control (RRC) connection complete message including single network slice selection assistance information (S-NSSAI), and transmitting, to the UE, an RRC connection release message including priority information related to the S-NSSAI.

8 Claims, 15 Drawing Sheets

(56) References Cited

OTHER PUBLICATIONS

3GPP TS 23.003 V17.6.0; 3rd Generation Partnership Project; Technical Specification Group Core Network and Terminals; Numbering, addressing and identification; (Release 17), Jun. 2022.
3GPP TS 38.304 V17.1.0; 3rd Generation Partnership Project; Technical Specification Group Radio Access Network; NR; User Equipment (UE) procedures in Idle mode and RRC Inactive state (Release 17), Jun. 2022.
Extended European Search Report dated Dec. 16, 2022, issued in a counterpart European Application No. 22188949.6-1216.
Samsung; Slice related cell reselection info in RRCRelease; 3GPP Tsg-Ran WG2 Meeting #113-e; R2-2100928; Jan. 15, 2021.
Samsung; Discussion on slice based cell reselection; 3GPP TSG-RAN WG2 Meeting #114-e; R2-2105438; May 11, 2021.
European Office Action dated Oct. 18, 2024, issued in European Patent Application No. 22188949.6.

\* cited by examiner

APPARATUS AND METHOD FOR CELL RESELECTION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0103360, filed on Aug. 5, 2021, in the Korean Intellectual Property Office, and of a Korean patent application number 10-2021-0105704, filed on Aug. 10, 2021, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for cell reselection in the wireless communication system.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and frequency quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Several networks logically separated may be provided through network slicing. A service provider may provide a dedicated network specialized for various services over networks having different characteristics.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for efficiently performing cell selection or reselection of a user equipment, through system information broadcast in a wireless communication system.

Another aspect of the disclosure is to provide a method and an apparatus for efficiently performing cell selection or reselection of a user equipment, through information related to network slice which provides an intended service in a wireless communication system.

Another aspect of the disclosure is to provide a method and an apparatus for efficiently performing cell selection or reselection of a user equipment, through a timer in a wireless communication system.

Additional aspects will be set forth in part in the description which follows and, in part, will be apparent from the description, or may be learned by practice of the presented embodiments.

In accordance with an aspect of the disclosure, a method performed by a base station (BS) is provided. The method includes transmitting system information including network slice related information, receiving, from a user equipment (UE), a radio resource control (RRC) connection complete message including single network slice selection assistance information (S-NSSAI), and transmitting, to the UE, an RRC connection release message including priority information related to the S-NSSAI.

In accordance with another aspect of the disclosure, a BS is provided. The base station includes a transceiver and at least one processor operatively connected with the transceiver, and the at least one processor may be configured to transmit system information including network slice related information, receive, from a UE, an RRC connection complete message including S-NSSAI, and transmit, to the UE, an RRC connection release message including priority information related to the S-NSSAI.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
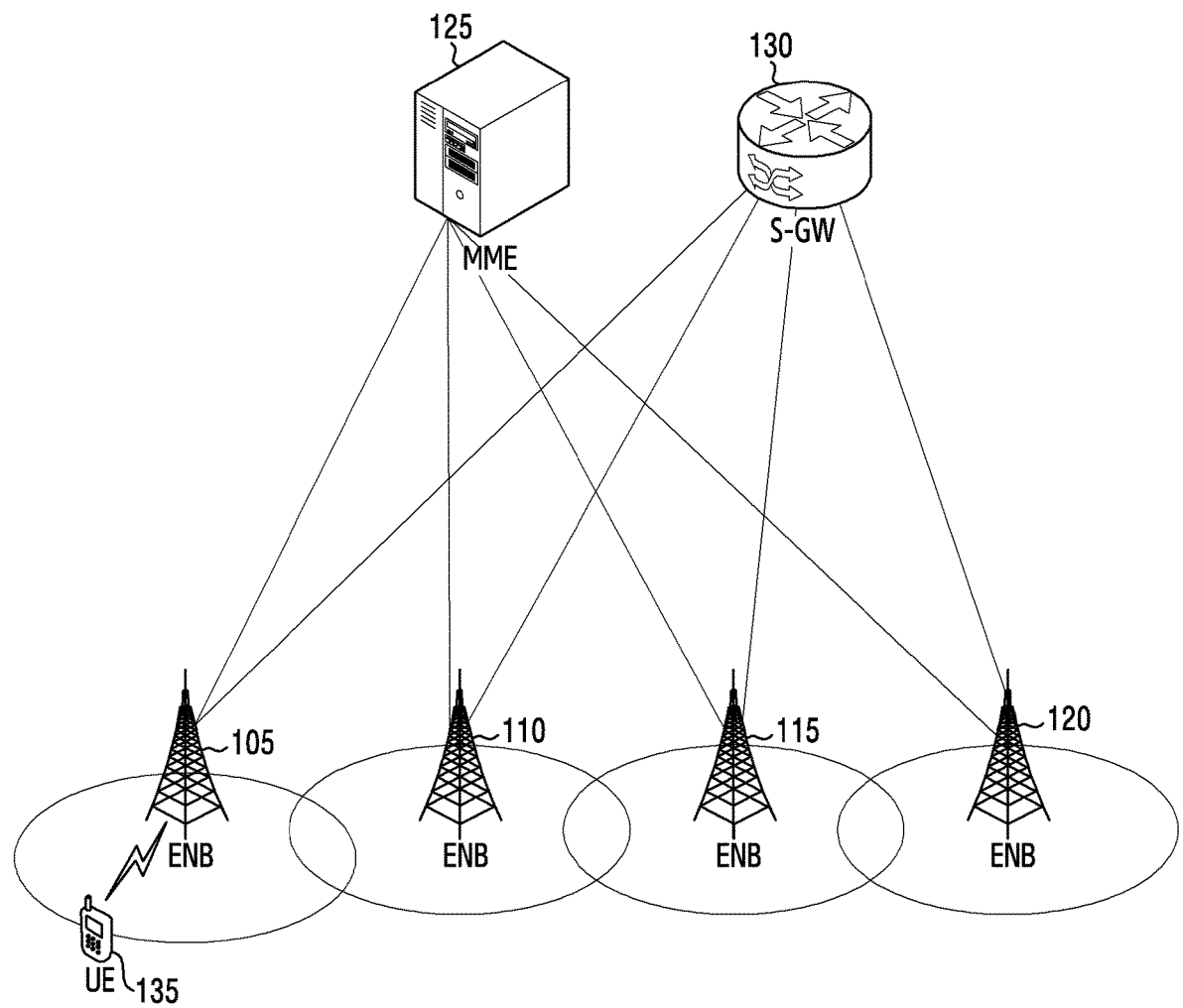
FIG. 1 illustrates an example of a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

A hardware-based approach will be described as an example in various embodiments of the disclosure to be described hereinafter. However, various embodiments of the disclosure include technology which uses both hardware and software, and thus various embodiments of the disclosure do not exclude a software-based approach.

Terms indicating signals (e.g., a message, information, a preamble, a signal, signaling, a sequence, a stream), terms indicating resources (e.g., a symbol, a slot, a subframe, a radio frame, a subcarrier, a resource element (RE), a resource block (RB), a physical RB (PRB), a bandwidth part (BWP), an occasion), terms indicating calculation states (e.g., a step, an operation, a procedure), terms indicating data (e.g., a packet, a user stream, information, a bit, a symbol, a codeword), terms indicating channels, terms indicating control information (e.g., downlink control information (DCI), a medium access control element (MAC CE), radio resource control (RRC) signaling, network entities), terms indicating network entities, terms indicating interfaces between network entities, and terms indicating components of a device used in the following explanation are illustrated only for convenience of description. Accordingly, the disclosure is not limited to the terms to be described, and other terms indicating targets having the same technical meaning may be used.

Also, in the disclosure, to determine whether a specific condition is satisfied or fulfilled, expressions such as greater than or less than are used but is merely an expression by way of example and does not exclude expressions of equal to or greater than or equal to or less than A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

Hereafter, for convenience of description, the disclosure uses terms and names defined in 3rd generation partnership project (3GPP) specifications. However, the disclosure is not limited by the terms and names, and may be applied equally to systems conforming to other standards. An evolved node B (eNB) may be identically understood as a next generation node B (gNB) in the disclosure for convenience of description. That is, description on the eNB may be identically applied to description on the gNB.

FIG. 1 illustrates an example of a wireless communication system according to an embodiment of the disclosure. The wireless communication system of FIG. 1 may be a long-term evolution (LTE) system.

Referring to FIG. 1, the wireless communication system of FIG. 1 may include eNBs, node Bs or base stations 105, 110, 115, and 120, a mobility management entity (MME) 125 and a serving-gateway (S-GW) 130. A user equipment (UE) or a terminal 135 may access an external network through the eNB 105, 110, 115, and 120 and the S-GW 130.

The eNB 105, 110, 115, and 120 in FIG. 1 may correspond to an existing node B of a universal mobile telecommunication system (UMTS). The eNB 105, 110, 115, and 120 may be connected with the UE 135 over a radio channel, and may perform more complicated roles than the existing node B. The LTE system may service every user traffic including a real-time service such as a voice over internet protocol (VoIP) over a shared channel Hence, what is demanded is a device for collecting and scheduling status information of a buffer status, an available transmit power status, a channel status and so on of UEs, which may be carried out by the eNB 105, 110, 115, and 120.

One eNB 105, 110, 115, or 120 may control a plurality of cells in general. For example, to realize a data rate of 100 Mbps, the LTE system may use orthogonal frequency division multiplexing (OFDM) as a radio access technique in a 20 megahertz (MHz) bandwidth. In addition, the LTE system may apply an adaptive modulation & coding (AMC) scheme for determining a modulation scheme and a channel coding rate according to the channel status of the UE. The S-GW 130 may provide a data bearer, and generate or remove the data bearer under control of the MME 125. The MME 125 manages a mobility management function and various control functions of the UE, and may be connected with a plurality of eNBs.

Figure 2:
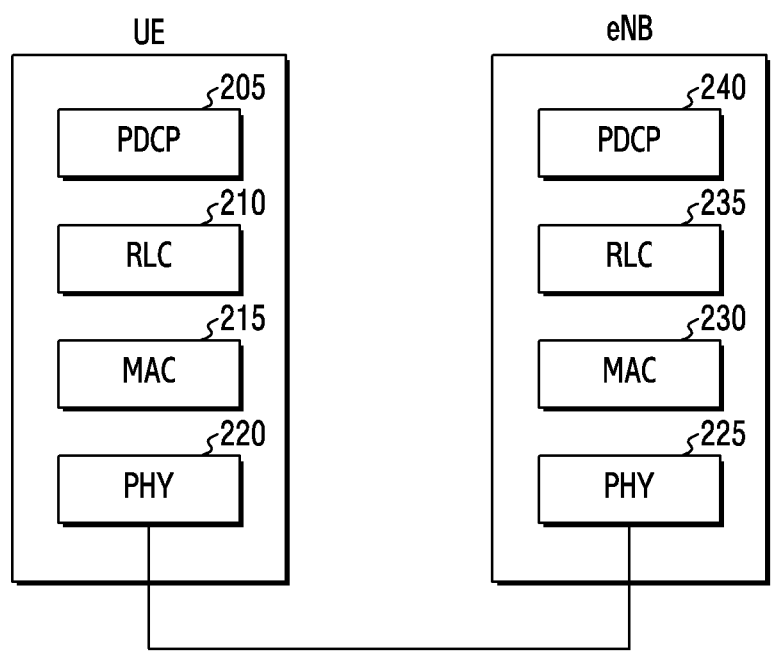
FIG. 2 illustrates an example of a radio protocol architecture in a wireless communication system according to an embodiment of the disclosure.

FIG. 2 illustrates an example of a radio protocol architecture in a wireless communication system according to an embodiment of the disclosure. The wireless communication system of FIG. 2 may be the LTE system of FIG. 1.

Referring to FIG. 2, the radio protocol of the LTE system may include packet data convergence protocols (PDCPs) 205 and 240, radio link controls (RLCs) 210 and 235, and medium access controls (MACs) 215 and 230 in the UE and the eNB respectively. The PDCP 205 and 240 may perform an operation such as internet protocol (IP) address compression/decompression. Main functions of the PDCP are as follows.

Header compression and decompression (robust header compression (ROHC)) only
Transfer of user data
In-sequence delivery of upper layer packet data units (PDUs) at PDCP re-establishment procedure for RLC acknowledged mode (AM)
For split bearers in dual connectivity (DC) (only support for RLC AM): PDCP PDU routing for transmission and PDCP PDU reordering for reception)
Duplicate detection of lower layer service data unit (SDU)s at PDCP re-establishment procedure for RLC AM)
Retransmission of PDCP SDUs at handover and, for split bearers in DC, of PDCP PDUs at PDCP data-recovery procedure, for RLC AM
Ciphering and deciphering
Timer-based SDU discard in uplink The RLC 210 and 235 may reconfigure a PDCP PDU in an appropriate size and perform an automatic repeat request (ARQ) operation. Main functions of the RLC are as follows.

Transfer of upper layer PDUs
Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for unacknowledged mode (UM) and AM data transfer)
Protocol error detection (only for AM data transfer)
RLC SDU discard (only for UM and AM data transfer)
RLC re-establishment The MAC 215 and 230 may be connected with several RLC layer devices configured in one UE, and may multiplex RLC PDUs into a MAC PDU and demultiplex RLC PDUs from a MAC PDU. Main functions of the MAC are as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through hybrid automatic repeat request (HARQ)
Priority handling between logical channels of one UE
Priority handling between UEs by means of dynamic scheduling
multimedia broadcast/multicast service (MBMS) service identification
Transport format selection
Padding A physical layer 220 and 225 may perform channel-code and modulate upper layer data, and generate and transmit OFDM symbols over the radio channel, or demodulate and channel-decode an OFDM symbol received over the radio channel and forward it to the upper layer.

Figure 3:
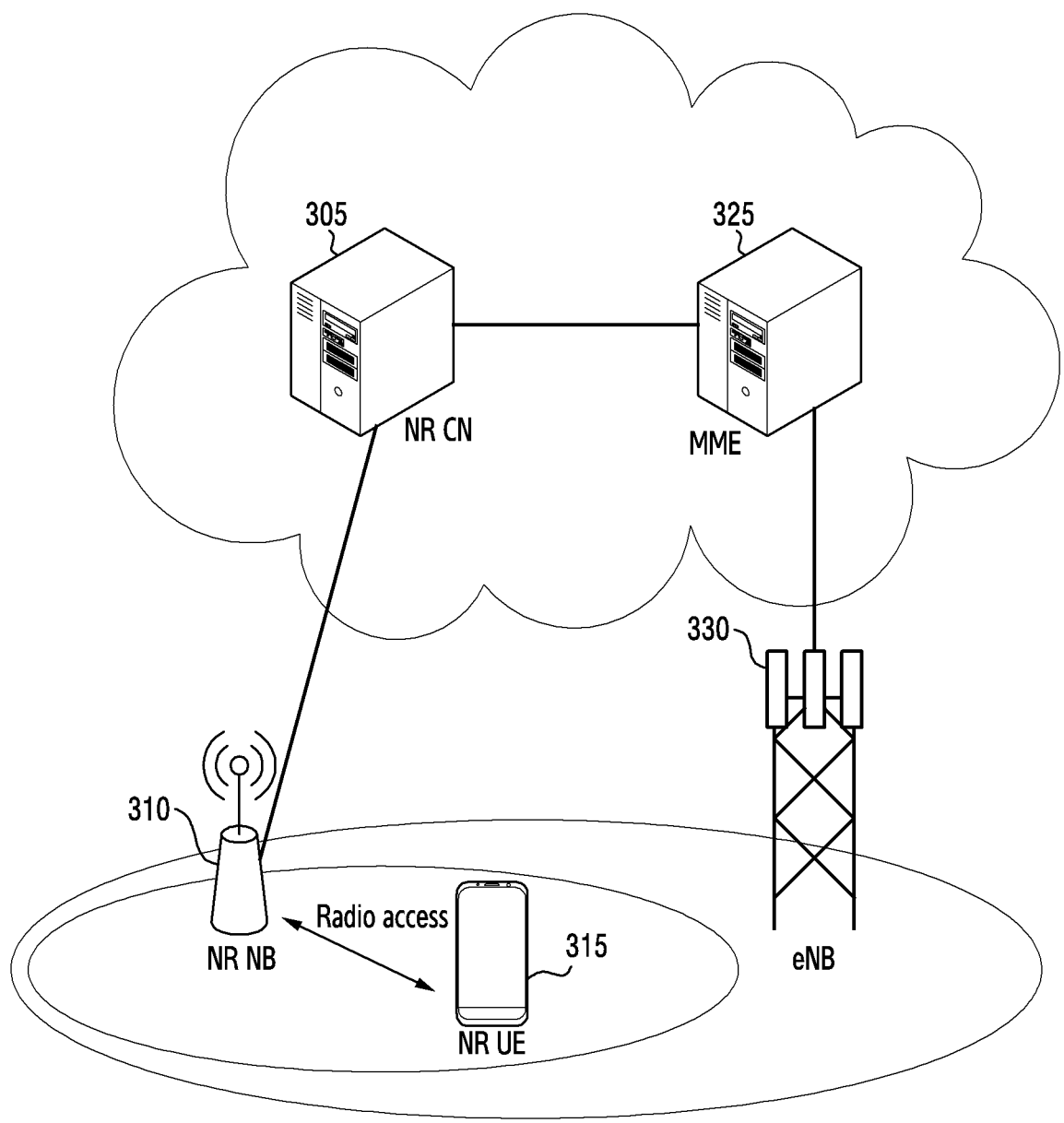
FIG. 3 illustrates an example of a next generation wireless communication system according to an embodiment of the disclosure.

FIG. 3 illustrates an example of a next generation wireless communication system according to an embodiment of the disclosure. The next generation wireless communication system of FIG. 3 may be a new radio (NR) system. The next generation wireless communication system describes the NR system by way of example in FIG. 3, but may be equally applied to a beyond 5G (B5G) or a $6^{th}$ generation (6G) system.

Referring to FIG. 3, the next generation wireless communication system (NR, or 5G) may include a NR node B, NR gNB or NR base station 310 and a NR core network (CN) 305. A NR UE or terminal 315 may access an external network via the NR gNB 310 and the NR CN 305.

Referring to FIG. 3, the NR gNB 310 may correspond to the eNB of the existing LTE system. The NR gNB 310 may be connected with the NR UE 315 over a radio channel, and may provide a far better service than the existing node B. Every user traffic may be serviced over a shared channel in the next generation wireless communication system. Accordingly, a device for collecting and scheduling status information of a buffer status, an available transmit power status, a channel status of UEs is required, which may be fulfilled by the NR NB 310.

One NR gNB 310 may generally control a plurality of cells. For example, to realize an ultra high speed data transmission compared with the existing LTE, the next generation wireless communication system may have the existing maximum bandwidth or more, and additionally use a beamforming technology by using the OFDM as the radio access technology. In addition, the next generation wireless communication system may adopt the AMC scheme which determines the modulation scheme and the channel coding rate according to the channel status of the UE. The NR CN 305 may perform functions such as mobility support, bearer setup, quality of service (QoS) setup. The NR CN 305 is a device for performing the mobility management function and various control functions for the UE and may be connected to a plurality of base stations. In addition, the next generation wireless communication system may be connected with the existing LTE system, and the NR CN 305 may be connected to the MME 325 through a network interface. The MME 325 may be connected to an eNB 2 330 which is the LTE base station.

Figure 4:
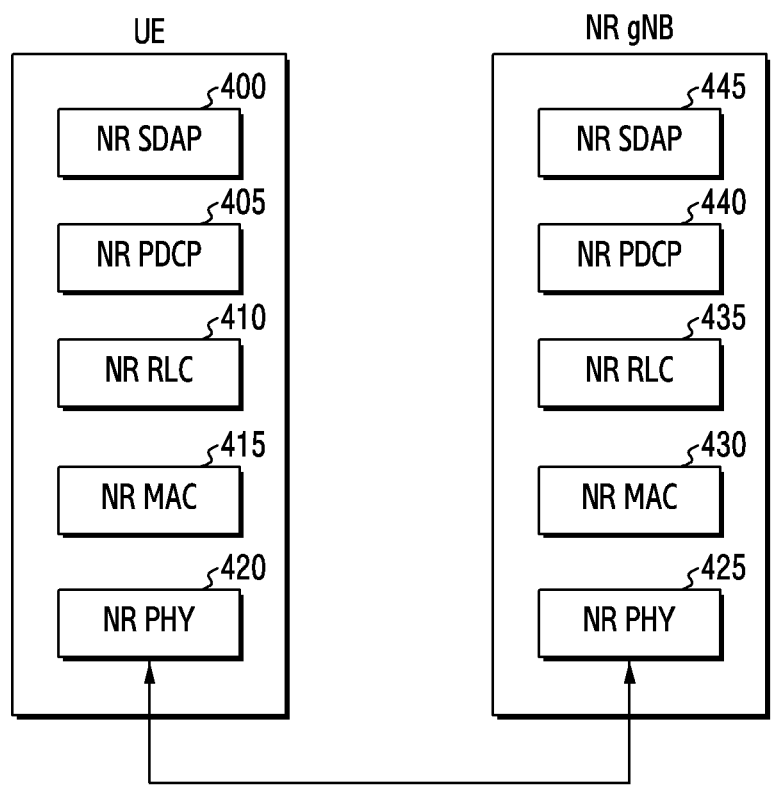
FIG. 4 illustrates an example of a radio protocol architecture of a next generation wireless communication system according to an embodiment of the disclosure.

FIG. 4 illustrates an example of a radio protocol architecture of a next generation wireless communication system according to an embodiment of the disclosure. The next generation wireless communication system of FIG. 4 may be the NR system of FIG. 3. The next generation wireless communication system describes the NR system of FIG. 3 by way of example in FIG. 4, but may be equally applied to the B5G or the 6G system.

Referring to FIG. 4, the radio protocol of the next generation wireless communication system may include NR service data adaptation protocols (SDAPs) 400 and 445, NR PDCPs 405 and 440, NR RLCs 410 and 435, and NR MACs 415 and 430 in the UE and the NR gNB respectively.

Main functions of the NR SDAPs 400 and 445 may include some of the following functions.
- Transfer of user plane data
- Mapping between a QoS flow and a data radio bearer (DRB) for both downlink (DL) and uplink (UL)
- Marking QoS flow identifier (ID) in both DL and UL packets
- Reflective QoS flow to DRB mapping for the UL SDAP PDUs With respect to an SDAP layer device, whether to use a header of the SDAP layer device or whether to use functions of the SDAP layer device for each PDCP layer device, bearer, or logical channel may be configured to the UE with a radio resource control (RRC) message. If the SDAP header is configured, the gNB may indicate the UE to update or reconfigure mapping information of QoS flow and data bearer of the uplink and the downlink, through a 1-bit on non-access stratum (NAS) reflective QoS indicator and a 1-bit access stratum (AS) reflective QoS indicator of the SDAP header. The SDAP header may include QoS flow ID information indicating the QoS. The QoS information may be used as data processing priority, scheduling information and so on to support a seamless service.

Main functions of the NR PDCPs 405 and 440 may include some of the following functions.
- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink In the above description, the reordering of the NR PDCP device may indicate a function of reordering PDCP PDUs received from a lower layer in order based on a PDCP sequence number (SN). The reordering of the NR PDCP device may include a function of transferring data to the upper layer in the reordered order, and a function of transferring it without considering the order. In addition, the reordering of the NR PDCP device may include a function of recording lost PDCP PDUs by reordering them, a function of reporting states of the lost PDCP PDUs to a transmitting side, and a function of requesting to retransmit the lost PDCP PDUs.

Main functions of the NR RLCs 410 and 435 may include some of the following functions.
- Transfer of upper layer PDUs
- In-sequence delivery of upper layer PDUs
- Out-of-sequence delivery of upper layer PDUs
- Error Correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment In the above description, the in-sequence delivery of the NR RLC device 410 and 435 may indicate a function of delivering RLC SDUs received from a lower layer to an upper layer in order. If one RLC SDU is divided into a plurality of RLC SDUs and received, the in-sequence delivery of the NR RLC device 410 and 435 may include a function of reassembling and delivering them, and a function of reordering the received RLC PDUs based on the RLC SN or the PDCP SN. In addition, the in-sequence delivery of the NR RLC device 410 and 435 may include a function of recording lost RLC PDUs by reordering them, a function of reporting states of the lost RLC PDUs to the transmitting side, and a function of requesting to retransmit the lost RLC PDUs.

If there is the lost RLC SDU, the in-sequence delivery of the NR RLC device 410 and 435 may include a function of delivering only the RLC SDUs before the lost RLC SDU to the upper layer in sequence. In addition, the in-sequence delivery of the NR RLC device 410 and 435 may include a function of, if the lost RLC SDU exists but a specific timer expires, delivering all the RLC SDUs received before the timer starts to the upper layer in sequence. In addition, the in-sequence delivery of the NR RLC device 410 and 435 may include a function of delivering all the RLC SDUs received so far to the upper layer in sequence if the lost RLC SDU exists but the specific timer expires.

The NR RLC device 410 and 435 may process the RLC PDUs in reception order (in order of arrival) and deliver them to the PDCP device regardless of the SN (out-of sequence delivery).

The NR RLC device 410 and 435, if receiving a segment, may receive segments stored in a buffer or to be received, reconfigure as one complete RLC PDU, and then process and transfer it to the PDCP device.

The NR RLC layer 410 and 435 may not include the concatenation function and may perform the function in the NR MAC layer or replace it with the multiplexing function of the NR MAC layer 415 and 430.

In the above description, the out-of-sequence delivery of the NR RLC device 410 and 435 may indicate a function of delivering the RLC SDUs received from the lower layer directly to the upper layer regardless of their order. The out-of-sequence delivery of the NR RLC device 410 and 435 may include a function of, if one RLC SDU is split into several RLC SDUs and received, reassembling and delivering them. In addition, the out-of-sequence delivery of the NR RLC device 410 and 435 may include a function of storing RLC SNs or PDCP SNs of the received RLC PDUs, ordering them and recording lost RLC PDUs.

The NR MACs 415 and 430 may be connected to several NR RLC layer devices configured in the UE. Main functions of the NR MAC may include some of the following functions.
- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding The NR PHY layers 420 and 425 may channel-code and modulate upper layer data, generate and transmit OFDM symbols over the radio channel, or demodulate and channel-decode OFDM symbols received over the radio channel and transfer to the upper layer.

Figure 5:
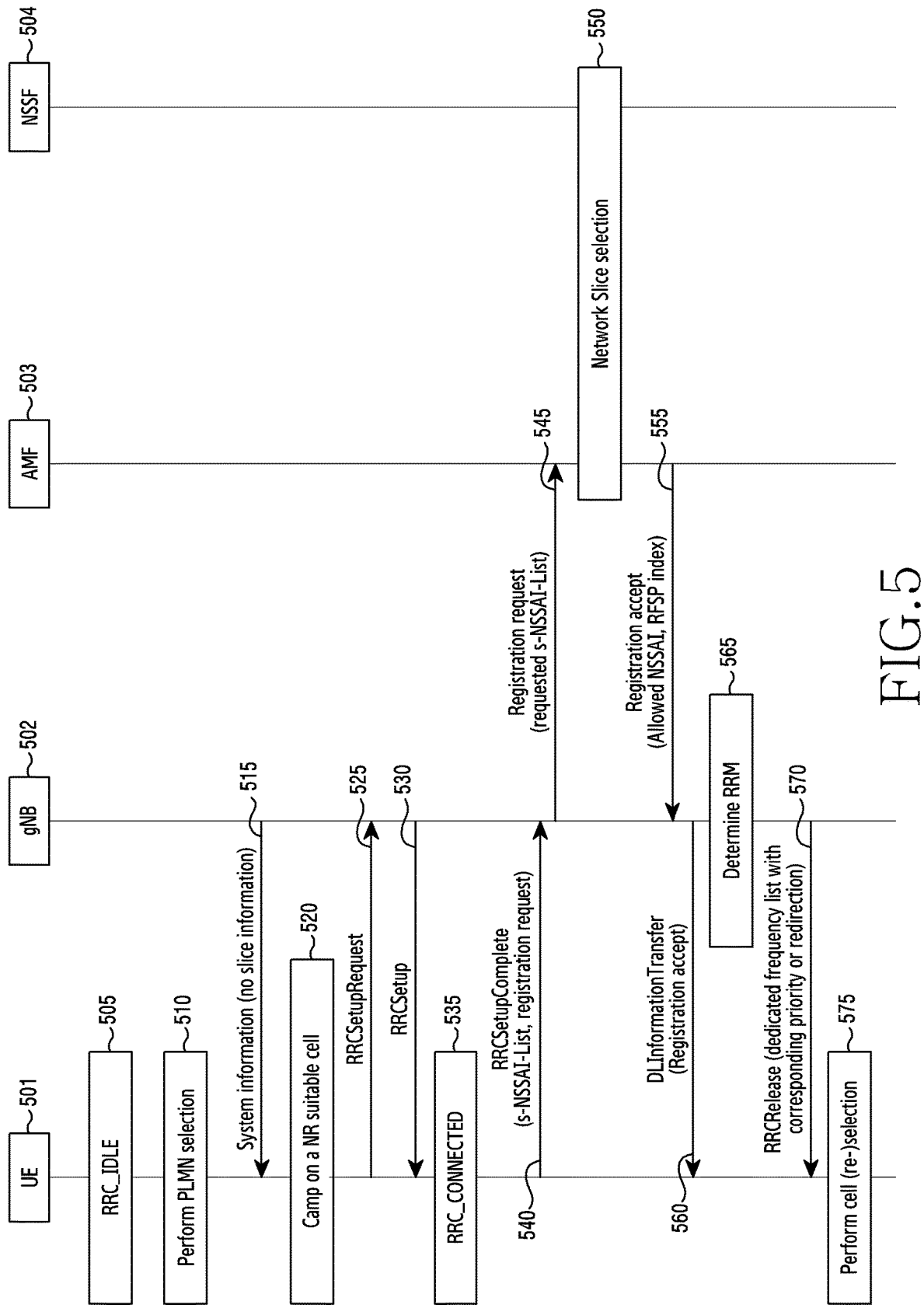
FIG. 5 illustrates an example of signaling for reselecting a cell which supports network slice according to an embodiment of the disclosure.

FIG. 5 illustrates an example of signaling for reselecting a cell which supports network slice according to an embodiment of the disclosure. Herein, the network slice may indicate a virtualized independent logical network. A network architecture which multiplexes virtualized independent logical networks on the same physical network infrastructure may be referred to as network slicing. The network slice may include one or more network slice instances. The network slice instance may indicate a set of network function instances and necessary resources (e.g., compute resource, storage resource, networking resource). By applying the network slicing, one communication network may be divided and used as separate independent logical networks according to a service type, a UE QoS, and other various properties. That is, the network slices are assigned separate virtualized network resources, to thus enable efficient network resource management, network reliability and security, and independent management. The network slice may be connected with a data network (DN), according to a policy, service characteristics, and so on. One or more DNs may be connected to one network slice, and one or more network slices may be connected to one DN.

FIG. 5 illustrates the example for explaining the signaling for reselecting the cell which supports the network slice which provides an intended service of a UE.

Referring to FIG. 5, in operation 505, a UE 501 may be in an RRC_IDLE mode. In operation 510, the UE 501 of the RRC_IDLE mode may select a public land mobile network (PLMN). The PLMN indicates a network identification number of a provider, and may indicate the provider identification number which supports the service. In operation 515, the UE 501 of the RRC_IDLE mode may receive system information from a gNB 502. After receiving the system information, the UE 501 may camp on a suitable cell or an NR suitable cell through a cell selection or cell reselection process. The system information received at the UE 501 from the gNB 502 in operation 515 may not include slice related information. In addition, the system information may include one cell reselection priority information per frequency based on the radio access technology (RAT). For example, information included in the system information as follows.

If cellReselectionPriority and cellReselectionSubPriority both are signaled, the UE 501 may derive a cell reselection priority value by adding two values. As a cell reselection priority value of a specific frequency increases, the UE 501 may perform a cell reselection evaluation procedure with the higher priority on the specific frequency.

SIB4: may broadcast a plurality of NR inter-frequencies. Each NR inter-frequency may include one cell reselection priority information.

SIB5: may broadcast a plurality of evolved-universal terrestrial radio access (EUTRA) frequencies. Each E-UTRA frequency may include one cell reselection priority information.

The UE 501 of the RRC_IDLE mode may perform an RRC connection establishment procedure with the camping-on cell in operation 520. In operation 525, the UE 501 may broadcast an RRCSetupRequest message to the gNB 502. In operation 530, the gNB 502 may transmit an RRCSetup message to the UE 501. The UE 501 receiving the RRCSetup message may apply setup information included in the RRCSetup message. In operation 535, the UE 501 may transit to an RRC_CONNECTED mode.

The UE 501 transiting to the RRC_CONNECTED mode in operation 535 may transmit an RRCSetupComplete message to the gNB 502. In operation 540, if an upper device provides one or more single network slice selection assistance information (N-SSAI), the UE 501 may transmit the RRCSetupComplete message to the gNB 502 by including an s-NSSAI-List. Also, in operation 540, the UE 501 may transmit the RRCSetupComplete message to the gNB 502 by including a registration request message. Each S-NSSAI may include slice/service type (SST) or SST and SST-slice differentiator (SST-SD). An abstract syntax notation one (ASN.1) structure is shown in the following Table 1.

TABLE 1

S-NSSAI
The IE S-NSSAI (Single Network Slice Selection Assistance Information) identifies a Network Slice end to end and comprises a slice/service type and a slice differentiator, see TS 23.003 [21].

S-NSSAI information element

-- ASN1START
-- TAG-S-NSSAI-START
S-NSSAI ::=                      CHOICE{
    sst                              BIT STRING (SIZE (8)),
    sst-SD                           BIT STRING (SIZE (32))
}
-- TAG-S-NSSAI-STOP
-- ASN1STOP S-NSSAI field descriptions sst
Indicates the S-NSSAI consisting of Slice/Service Type, see TS 23.003 [21].
sst-SD
Indicates the S-NSSAI consisting of Slice/Service Type and Slice Differentiator, see TS 23.003 [21].

system information block (SIB) 2: one cell reselection priority information of a serving NR frequency (a frequency provided by the cell currently camping on). Herein, the cell reselection priority information may indicate cellReselectionPriority and cellReselectionSubPriority(optional). cellReselectionPriority may include an integer value. For example, cellReselectionPriority may include one integer value from 0 to 7. Also, cellReselectionSubPriority may include a decimal value. For example, cellReselectionSubPriority may include one decimal value of 0.2, 0.4, 0.6, and 0.8.

In operation 545, the gNB 502 may forward the registration request message to an access and mobility management function (AMF) 503.

In operation 550, a network slice selection function (NSSF) 504 may select a network slice supportable by a 5G core (5GC), and transfer the selected network slice to the AMF 503.

In operation 555, the AMF 503 may transmit to the gNB 502 a registration accept message including the supportable NSSAI. The registration accept message may also include a RAT/frequency slice selection priority (RFSP) index value.

In operation 560, the gNB 502 may transmit a DLInformationTransfer message to the UE 501. The DLInformationTransfer message may include the registration accept message received from the AMF 503.

In operation 565, the gNB 502 may perform radio resource management (RRM) based on the RFSP index received from the AMF 503.

In operation 570, the gNB 502 may transmit an RRCRelease message for migrating to a cell which supports the network slice requested by the UE 501. The RRCRelease message may include at least one of one cell reselection priority information based on the RAT (e.g., NR, EUTRA) per frequency and timer values commonly applied regardless of the RAT. For example, the priority information may be included and provided in cellReselectionPriorities of the RRCRelease message. Specifically, cellReselectionPriorities may include at least one of the following parameters.

FreqPrioritListEUTRA: A list including one or more FreqPriorityEUTRAs. Each FreqPriorityEUTRA may include carrierFreq, cellReselectionPriority, and cellReselectionSubPriority (optional). carrierFreq may include an ARFCN-ValueEUTRA value indicating an absolute radio frequency channel number (AFRCN). cellReselectionPriority may include an integer value. For example, cellReselectionPriority may include one integer value from 0 to 7. Also, cellReselectionSubPriority may include a decimal value. For example, it may include one decimal value of 0.2, 0.4, 0.6, and 0.8. If both cellReselectionPriority and cellReselectionSubPriority are signaled, the UE 501 may derive a cell reselection priority value by adding two values. As a cell reselection priority value of a specific frequency increases, the UE 501 may perform the cell reselection evaluation procedure with the higher priority on the specific frequency.

FreqPrioritListNR: A list including one or more FreqPriorityNRs. Each FreqPriorityNR may include carrierFreq, cellReselectionPriority, and cellReselectionSubPriority(optional). carrierFreq may include an ARFCN-ValueEUTRA value indicating the AFRCN. cellReselectionPriority may include an integer value. For example, it may include one integer value from 0 to 7. Also, cellReselectionSubPriority may include a decimal value. For example, it may include one decimal value of 0.2, 0.4, 0.6, and 0.8. If both cellReselectionPriority and cellReselectionSubPriority are signaled, the UE 501 may derive a cell reselection priority value by adding two values. As a cell reselection priority value of a specific frequency increases, the UE 501 may perform the cell reselection evaluation procedure with the higher priority on the specific frequency.

T320 timer value

If the RRCRelease message includes one cell reselection priority information per frequency based on the RAT, the UE 501 may store it. If the RRCRelease message includes the T320 timer value, the UE 501 may drive a T320 timer based on the T320 timer value. While the T320 timer is running or if the RRCRelease message does not include the T320 timer value, the UE 501 may perform the cell reselection based on the one cell reselection priority information per frequency based on the RAT. That is, the UE 501 may ignore the one cell reselection priority information broadcast in the system information. If the T320 timer expires, the UE 501 may perform the cell reselection by applying the cell reselection priority information broadcast in the system information.

The RRCRelease message may include the frequency or the frequency list supported by the network slice requested by the UE 501 and the priority value mapped thereto. In addition, the RRCRelease may indicate redirection to the frequency or the RAT supported by the network slice requested by the UE 501. The RRCRelease message or a HO command may not include network slice information.

In operation 575, the UE 501 may perform the cell selection or the cell reselection based on the information included in the RRCRelease message or the system information.

Referring to FIG. 5, the system information does not broadcast the network slice information. The UE, which does not know whether the list (s-NSSAI-List) related to the requested network slices is allowed, performs the RRC setup procedure with the gNB. The gNB does not separately include the network slice information in the RRCRelease message, and includes appropriate configuration information to reselect the cell supported by the network slice requested by the UE. Herein, the s-NSSAI list supported in a registration area may be the same. As aforementioned, the UE may not perform reselection for an inter-RAT cell, if the network slice configuration information is configured and a new timer is not set or the network slice configuration information is not deleted (i.e., released) before the new timer expires. In addition, the reselection to the inter-RAT cell is required, the inter-RAT cell may not support the network slice. Hence, signaling examples for the cell selection or reselection supporting the network slice desired by the UE are described, in FIG. 6 through FIG. 10. Also, in FIG. 11 through FIG. 13, flowchart examples for the cell selection or reselection supporting the network slice desired by the UE are described.

Figure 6:
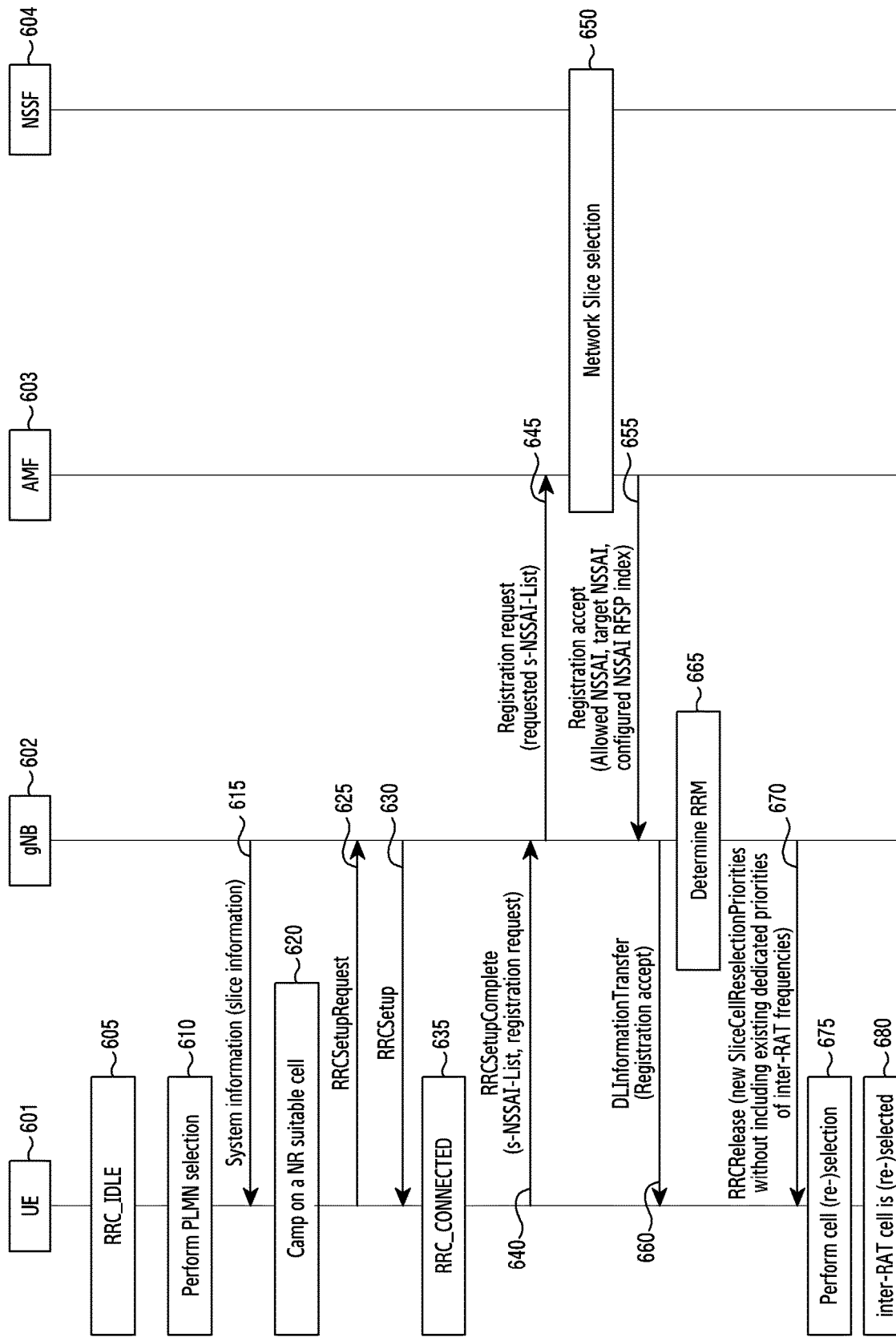
FIG. 6 illustrates an example of signaling for reselecting a cell which supports network slice according to an embodiment of the disclosure.

FIG. 6 illustrates an example of signaling for reselecting a cell which supports a network slice according to an embodiment of the disclosure. FIG. 6 illustrates the signaling example for reselecting the cell which supports the network slice providing an intended service of a UE.

Referring to FIG. 6, in operation 605, a UE 601 may be in the RRC_IDLE mode. The UE 601 may perform the network slice based cell reselection process. In operation 610, the UE 601 of the RRC_IDLE mode may select the PLMN. In operation 615, the UE 601 of the RRC_IDLE mode may receive system information from by a gNB 602. After receiving the system information, the UE 601 may camp on a suitable cell, or an NR suitable cell through the cell selection or the cell reselection. According to an embodiment, the system information may include network slice related information. For example, information included in the system information as follows.

SIB2: may broadcast a serving NR frequency (a frequency provided by the cell currently camping on), an S-NSSAI list supportable in the NR serving frequency or a slice group, and cell reselection priority information mapped to the S-NSSAI list. The cell reselection priority information mapped to the S-NSSAI list may indicate cellReselectionPriority and cellReselectionSubPriority (optional). Alternatively, the serving NR frequency (the frequency provided by the cell currently camping on), the S-NSSAI list supportable in the NR serving frequency, and the cell reselection priority information mapped to each S-NSSAI may be broadcast. Each S-NSSAI may be broadcast as SST or SST and SST-SD. Alternatively, each S-NSSAI may be broadcast as an index indicating a specific SST or SST and SST-SD. If each S-NSSAI is broadcast as the index indicating the specific SST or SST and SST-SD, the UE

601 may set the index through a NAS message. Alternatively, each S-NSSAI may be broadcast as an SST or SST and SST-SD list indicating the S-NSSAI list. Each S-NSSAI may be broadcast as an index indicating a specific S-NSSAI list. If each S-NSSAI is broadcast as the index indicating the specific S-NSSAI list, the UE 601 may set the index through a NAS message.

SIB4: a plurality of NR inter-frequencies, the S-NSSAI list supportable per NR inter-frequency or the slice group, and the cell reselection priority information mapped to the corresponding S-NSSAI list may be broadcast. Alternatively, a plurality of NR inter-frequencies, the S-NSSAI list supportable per NR inter-frequency, and the cell reselection priority information mapped to each S-NSSAI may be broadcast. Each S-NSSAI may be broadcast as an SST or an SST and an SST-SD. Alternatively, each S-NSSAI may be broadcast as an index indicating a specific SST or SST and SST-SD. If each S-NSSAI is broadcast as the index indicating the specific SST or SST and SST-SD, the UE 601 may set the index through a NAS message. Alternatively, each S-NSSAI may be broadcast as an SST or SST and SST-SD list indicating the S-NSSAI list, and may be broadcast as an index indicating a specific S-NSSAI list. If each S-NSSAI is broadcast as the index indicating the specific S-NSSAI list, the UE 601 may set the index through a NAS message.

SIB5: may broadcast a plurality of EUTRA frequencies, and each E-UTRA inter-frequency may include one cell reselection priority information. The E-UTRA frequency may not broadcast network slice information.

As such, the system information is broadcast from the gNB 602, and may indicate NR system information.

The UE 601 of the RRC_IDLE mode may perform the RRC setup procedure with the camping-on cell in operation 620. In operation 625, the UE 601 may broadcast an RRCSetupRequest message to the gNB 602. In operation 630, the gNB 602 may transmit an RRCSetup message to the UE 601. The UE 601 receiving the RRCSetup message may apply configuration information included in the RRCSetup message in operation 630. In operation 635, the UE 601 may transit to the RRC_CONNECTED mode.

The UE 601 transiting to the RRC_CONNECTED mode in operation 635 may transmit an RRCSetupComplete message to the gNB 602. In operation 640, if an upper layer device provides one or more S-SSAI, the UE 601 may transmit the RRCSetupComplete message to the gNB 602 by including an s-NSSAI-List. Also, in operation 640, the UE 601 may transmit the RRCSetupComplete message to the gNB 602 by including a registration request message. Each S-NSSAI may include the SST or the SST and the SST-SD. The ASN.1 structure is shown in the following Table 2.

TABLE 2

S-NSSAI

The IE S-NSSAI (Single Network Slice Selection Assistance Information) identifies a Network Slice end to end and comprises a slice/service type and a slice differentiator, see TS 23.003 [21].

S-NSSAI information element

-- ASN1START

-- TAG-S-NSSAI-START

| S-NSSAI ::= | CHOICE{ |
|---|---|
| sst | BIT STRING (SIZE (8)), |
| sst-SD | BIT STRING (SIZE (32)) |
| } | |

-- TAG-S-NSSAI-STOP

-- ASN1STOP

S-NSSAI field descriptions sst

Indicates the S-NSSAI consistinq of Slice/Service Type, see TS 23.003 [21].

sst-SD

Indicates the S-NSSAI consisting of Slice/Service Type and Slice Differentiator, see TS 23.003 [21].

In operation 645, the gNB 602 may forward the registration request message to an AMF 603.

In operation 650, an NSSF 604 may select a network slice supportable by the 5GC, and transfer the selected network slice to the AMF 603.

In operation 655, the AMF 603 may transmit to the gNB 602 a registration accept message including the supportable NSSAI. The AMF 603 may transmit the registration accept message to the gNB 602 by including the NSSAI configurable to the UE 601. In addition, the AMF 603 may transmit the registration accept message to the gNB 602 by including the NSSAI configurable in the UE 601. In addition, the AMF 603 may transmit the registration accept message to the gNB 602 by including an unsupportable NSSAI (target NSSAI) among the NSSAI requested by the UE 601. The registration accept message may also include the RFSP index value.

In operation 660, the gNB 602 may transmit a DLInformationTransfer message to the UE 601. The DLInformationTransfer message may include the registration accept message received from the AMF 603.

In operation 665, the gNB 602 may perform the RRM based on the RFSP index received from the AMF 603.

In operation 670, the gNB 602 may transmit an RRCRelease message for migrating to a cell which supports the network slice requested by the UE 601. According to an embodiment, the RRCRelease message may include SliceCellReselectionPriorities. The RRCRelease message may include only one of CellReselectionPriorities and SliceCellReselectionPriorities. SliceCellReselectionPriorities may include FreqPriorityListNR for each S-NSSAI. Alternatively, SliceCellReselectionPriorities may include FreqPriorityListNR supporting the NSSAI list. SliceCellReselectionPriorities may include FreqPriorityListNR without network slice information. SliceCellReselectionPriorities may include a new timer value. According to an embodiment, SliceCellReselectionPriorities may not include FreqPriorityListEUTRA. Each S-NSSAI may be included as the SST or the SST and the SST-SD in the RRCRelease message. Alternatively, each S-NSSAI may be broadcast as an index indicating a specific SST or SST and SST-SD. If each S-NSSAI is broadcast as the index indicating the specific SST or SST and SST-SD, the UE 601 may set the index through a NAS message. Alternatively, an SST or SST and SST-SD list indicating the S-NSSAI list as each S-NSSAI may be included in the RRCRelease message. Alternatively, each S-NSSAI may be included as an index indicating a specific S-NSSAI list in the RRCRelease message. If each S-NSSAI is broadcast as the index indicating the specific S-NSSAI list, the UE 601 may set the index through a NAS message.

If the RRCRelease message includes SliceCellReselectionPriorities, the UE 601 may store it. If the RRCRelease message includes the new timer value, the UE 601 may run a new timer based on the new timer value. While the new timer is running or if the RRCRelease message does not include the new timer value, the UE 601 may perform the cell reselection based on SliceCellReselectionPriorities included in the RRCRelease message. That is, the UE 601 may ignore network slice information of the NR frequency broadcast in the system information (e.g., SIB2, SIB4). If the new timer expires, the UE 601 may perform the cell reselection by applying the network slice information of the NR frequency broadcast in the system information (e.g., SIB2, SIB4).

In operation 675, the UE 601 may perform the cell selection or the cell reselection based on the information included in the RRCRelease message or the system information. According to an embodiment, if performing inter-RAT (e.g., EUTRA cell) cell reselection, the UE 601 may use cell reselection priority information broadcast in the system information (e.g., SIB5).

In operation 680, the UE 601 may select or reselect an inter-RAT cell. The UE 601 may release SliceCellReselectionPriorities received in operation 670 and stop the new timer running. Alternatively, the UE 601 may maintain SliceCellReselectionPriorities received in operation 670 and keep running the new timer. However, the UE 601 may perform the cell selection or the cell reselection based on system information broadcast from the selected or reselected inter-RAT cell. That is, if selecting or reselecting an NR cell, the UE 601 may perform the cell selection or the cell reselection by applying SliceCellReselectionPriorities received in operation 670.

Figure 7:
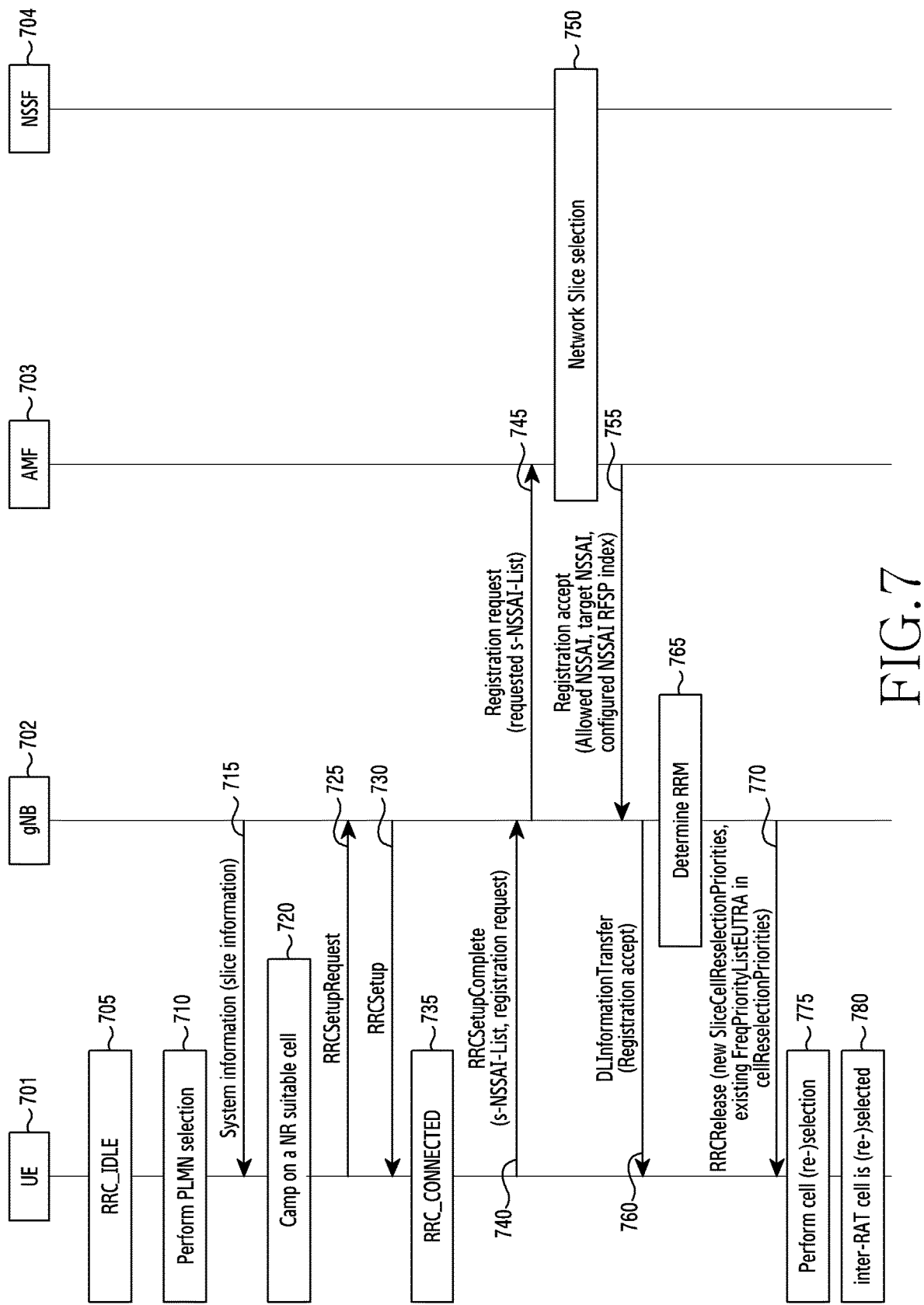
FIG. 7 illustrates another example of signaling for reselecting a cell which supports network slice according to an embodiment of the disclosure.

FIG. 7 illustrates another example of signaling for reselecting a cell which supports a network slice according to an embodiment of the disclosure. FIG. 7 illustrates another signaling example for reselecting the cell which supports the network slice providing a UE's intended service.

Referring to FIG. 7, in operation 705, a UE 701 may be in the RRC_IDLE mode. The UE 701 may perform the network slice based cell reselection process. In operation 710, the UE 701 of the RRC_IDLE mode may select the PLMN. In operation 715, the UE 701 of the RRC_IDLE mode may receive system information broadcast by a gNB 702. After receiving the system information, the UE 701 may camp on a suitable cell, or an NR suitable cell through the cell selection or cell reselection process. According to an embodiment, the system information may include network slice related information. For example, information included in the system information is as follows.

SIB2: may broadcast the serving NR frequency (e.g., the frequency provided by the cell currently camping on), the S-NSSAI list supportable in the NR serving frequency or the slice group, and the cell reselection priority information mapped to the S-NSSAI list. The cell reselection priority information mapped to the S-NSSAI list may indicate cellReselectionPriority and cellReselectionSubPriority(optional). Alternatively, the serving NR frequency (the frequency of the currently camping-on cell), the S-NSSAI list supportable in the NR serving frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 701 may set the index through a NAS message. Alternatively, each S-NSSAI may be broadcast as an SST or SST and SST-SD list indicating the S-NSSAI list, and may be broadcast as an index indicating a specific S-NSSAI list. If each S-NSSAI is broadcast as the index indicating the specific S-NSSAI list, the UE 701 may set the index through a NAS message.

SIB4: the plurality of the NR inter-frequencies, the S-NSSAI list supportable per NR inter-frequency or the slice group, and the cell reselection priority information mapped to the corresponding S-NSSAI list may be broadcast. Alternatively, the plurality of the NR inter-frequencies, the S-NSSAI list supportable per NR inter-frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 701 may set the index through a NAS message. Alternatively, each S-NSSAI may be broadcast as an SST or SST and SST-SD list indicating the S-NSSAI list. Each S-NSSAI may be broadcast as an index indicating a specific S-NSSAI list. If each S-NSSAI may be broadcast as the index indicating the specific S-NSSAI list, the UE 701 may set the index through a NAS message.

SIB5: may broadcast the plurality of the EUTRA frequencies. Each E-UTRA inter-frequency may include one cell reselection priority information. The E-UTRA frequency may not broadcast the network slice information.

As such, the system information is broadcast from the gNB 702, and may indicate NR system information.

The UE 701 of the RRC_IDLE mode may perform the RRC setup procedure with the camping-on cell in operation 720. In operation 725, the UE 701 may broadcast an RRCSetupRequest message to the gNB 702. In operation 730, the gNB 702 may transmit an RRCSetup message to the UE 701. The UE 701 receiving the RRCSetup message may apply configuration information included in the RRCSetup message in operation 730. In operation 735, the UE 701 may transit to the RRC_CONNECTED mode.

The UE 701 transiting to the RRC_CONNECTED mode in operation 735 may transmit an RRCSetupComplete message to the gNB 702. In operation 740, if an upper layer device provides one or more S-SSAI, the UE 701 may transmit the RRCSetupComplete message to the gNB 702 by including an s-NSSAI-List. Also, in operation 740, the UE 701 may transmit the RRCSetupComplete message to the gNB 702 by including a registration request message. Each S-NSSAI may include the SST or the SST and the SST-SD. The ASN.1 structure is shown in the following Table 3.

the registration accept message to the gNB 702 by including a target NSSAI unsupportable among the NSSAI requested by the UE 701. The registration accept message may also include the RFSP index value.

In operation 760, the gNB 702 may transmit a DLInformationTransfer message to the UE 701. The DLInformationTransfer message may include the registration accept message received from the AMF 703.

In operation 765, the gNB 702 may perform the RRM based on the RFSP index received from the AMF 703.

In operation 770, the gNB 702 may transmit an RRCRelease message for migrating to a cell which supports the network slice requested by the UE 701. According to an embodiment, the RRCRelease message may include SliceCellReselectionPriorities. The RRCRelease message may include both of CellReselectionPriorities and SliceCellReselectionPriorities. SliceCellReselectionPriorities may include FreqPriorityListNR for each S-NSSAI. Alternatively, SliceCellReselectionPriorities may include FreqPriorityListNR supporting the S-NSSAI list. SliceCellReselectionPriorities may include a new timer value. SliceCellReselectionPriorities may include FreqPriorityListEUTRA without the network slice information. According to an embodiment, SliceCellReselectionPriorities may not include FreqPriorityListEUTRA. Each S-NSSAI may be included as the SST or the SST and the SST-SD in the RRCRelease message. Alternatively, each S-NSSAI may be broadcast as an index indicating a specific SST or SST and SST-SD. If each S-NSSAI is broadcast as the index indicating the specific SST or SST and SST-SD, the UE 701 may set the index through a NAS message. Alternatively, the SST or SST and SST-SD list indicating the S-NSSAI list with each S-NSSAI may be included in the RRCRelease message. Alternatively, each S-NSSAI may be included as an index indicating a specific S-NSSAI list in the RRCRelease message. If each S-NSSAI is broadcast as the index indicating the specific S-NSSAI list, the UE 701 may set the

TABLE 3

S-NSSAI
The IE S-NSSAI (Single Network Slice Selection Assistance Information) identifies a Network Slice end to end and comprises a slice/service type and a slice differentiator, see TS 23.003 [21].
                    S-NSSAI information element
-- ASN1START
-- TAG-S-NSSAI-START
S-NSSAI ::=                    CHOICE{
  sst                            BIT STRING (SIZE (8)),
  sst-SD                         BIT STRING (SIZE (32))
}
-- TAG-S-NSSAI-STOP
-- ASN1STOP S-NSSAI field descriptions sst
Indicates the S-NSSAI consisting of Slice/Service Type, see TS 23.003 |21].
sst-SD
Indicates the S-NSSAI consisting of Slice/Service Type and Slice Differentiator, see TS 23.003 [21].

In operation 745, the gNB 702 may forward the registration request message to an AMF 703.

In operation 750, an NSSF 704 may select a network slice supportable by the 5GC, and transfer the selected network slice to the AMF 703.

In operation 755, the AMF 703 may transmit to the gNB 702 a registration accept message including the supportable NSSAI. The AMF 703 may transmit the registration accept message to the gNB 702 by including the NSSAI configurable to the UE 701. In addition, the AMF 703 may transmit index through a NAS message. CellReselectionPriorities may include only FreqPriorityListEUTRA. Alternatively, CellReselectionPriorities may include a T320 timer value and FreqPriorityListEUTRA.

If the RRCRelease message includes the new timer value (or the T320 timer value) alone, the UE 701 may run a new timer (or a T320 timer) based on the new timer value (or the T320 timer value). While the new timer (or the T320 timer) is running or the RRCRelease message does not include the new timer value (or the T320 timer value), the UE 701 may perform the cell reselection based on SliceCellReselectionPriorities and FreqPriorityListEUTRA included in the RRCRelease message. That is, the UE 701 may ignore the network slice information of the NR frequency and the cell reselection priority information of the E-UTRA frequency broadcast in the system information (e.g., SIB2, SIB4, SIB5). If the new timer (or the T320 timer) expires, the UE 701 may fulfill the cell reselection by applying the network slice information of the NR frequency and the cell reselection priority information of the E-UTRA frequency broadcast in the system information (e.g., SIB2, SIB4, SIB5).

If the RRCRelease message includes both the T320 timer value and the new timer value, FreqPriorityListEUTRA included in the RRCRelease message may be determined by the T320 timer whether to apply or release it, and SliceCellReselectionPriorities included in the RRCRelease message may be determined by the new timer whether to apply or release it.

In operation 775, the UE 701 may perform the cell selection or the cell reselection based on the information included in the RRCRelease message or the system information.

In operation 780, the UE 701 may select or reselect an inter-RAT cell. The UE 701 may release SliceCellReselectionPriorities received in operation 770 and stop the new timer (or the T320 timer) running. Alternatively, the UE 701 may maintain SliceCellReselectionPriorities received in operation 770 and keep running the new timer (or the T320 timer). However, the UE 701 may perform the cell selection or the cell reselection based on system information broadcast in the selected or reselected inter-RAT cell. That is, if selecting or reselecting an NR cell, the UE 701 may perform the cell selection or the cell reselection by applying SliceCellReselectionPriorities received in operation 770. The UE 701 may perform the cell reselection by applying FreqPriorityListEUTRA received in operation 770. Alternatively, the UE 701 may release FreqPriorityListEUTRA received in operation 770 and stop the new timer (or the T320 timer) running. The UE 701 may perform the cell selection or the cell reselection based on system information broadcast from the selected or reselected inter-RAT cell.

Figure 8:
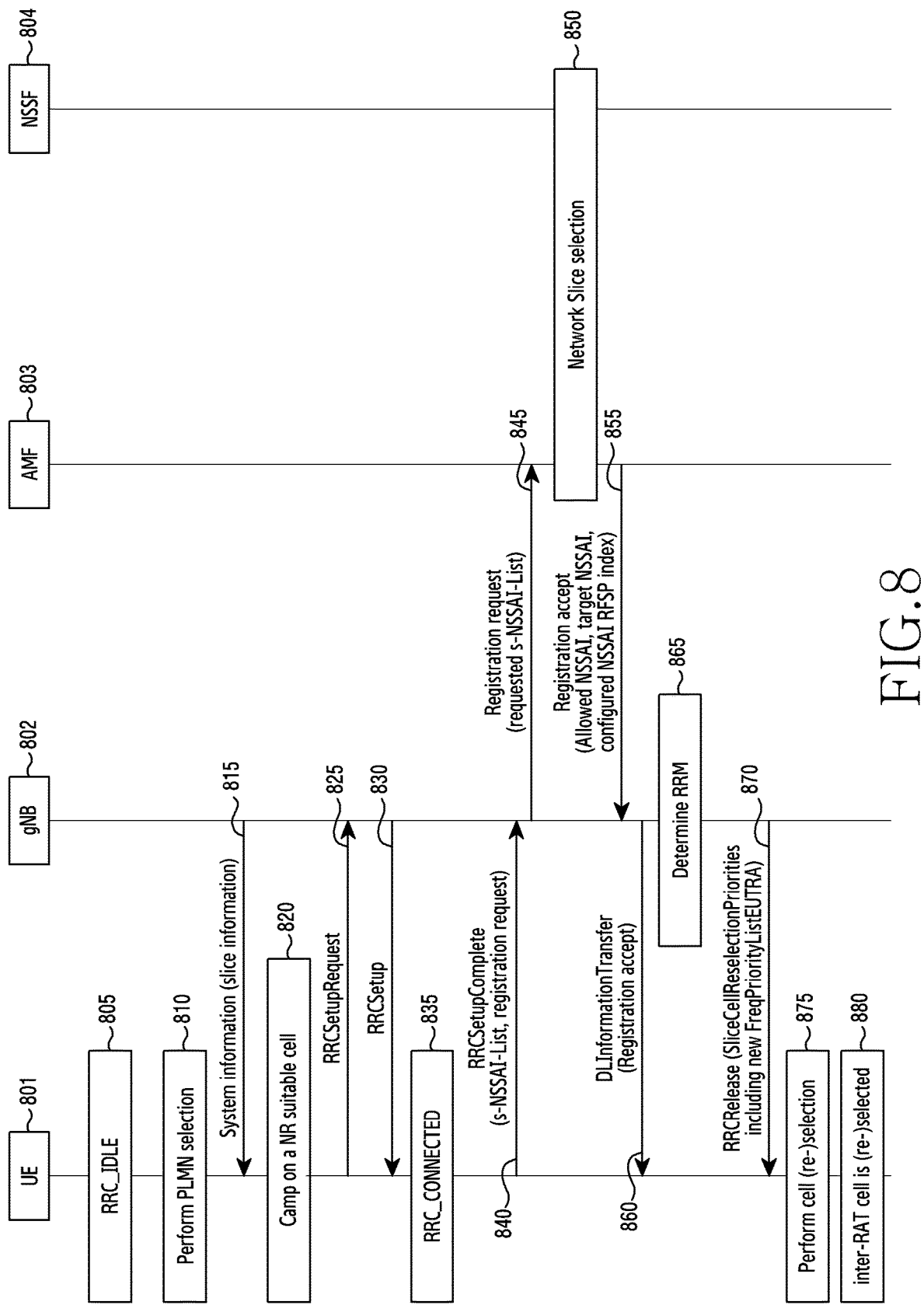
FIG. 8 illustrates yet another example of signaling for reselecting a cell which supports network slice according to an embodiment of the disclosure.

FIG. 8 illustrates yet another example of signaling for reselecting a cell which supports a network slice according to an embodiment of the disclosure. FIG. 8 illustrates yet another signaling example for reselecting the cell which supports the network slice providing a UE's intended service.

Referring to FIG. 8, in operation 805, a UE 801 may be in the RRC_IDLE mode. The UE 801 may perform the network slice based cell reselection process. In operation 810, the UE 801 of the RRC_IDLE mode may select the PLMN. In operation 815, the UE 801 of the RRC_IDLE mode may receive system information broadcast by a gNB 802. After receiving the system information, the UE 801 may camp on a suitable cell, or an NR suitable cell through the cell selection or cell reselection process. According to an embodiment, the system information may include network slice related information. For example, information included in the system information is as follows.

SIB2: may broadcast the serving NR frequency (the frequency provided by the cell currently camping on), the S-NSSAI list supportable in the NR serving frequency or the slice group, and the cell reselection priority information mapped to the S-NSSAI list. The cell reselection priority information mapped to the S-NSSAI list may indicate cellReselectionPriority and cellReselectionSubPriority (optional). Alternatively, the serving NR frequency (the frequency provided by the cell currently camping on), the S-NSSAI list supportable in the NR serving frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 801 may set the index through a NAS message. Alternatively, each S-NSSAI may be broadcast as the SST or SST and SST-SD list indicating the S-NSSAI list. Each S-NSSAI may be broadcast as an index indicating a specific S-NSSAI list. If each S-NSSAI is broadcast as the index indicating the specific S-NSSAI list, the UE 801 may set the index through a NAS message.

SIB4: the plurality of the NR inter-frequencies, the S-NSSAI list supportable per NR inter-frequency or the slice group, and the cell reselection priority information mapped to the corresponding S-NSSAI list may be broadcast. Alternatively, the plurality of the NR inter-frequencies, the S-NSSAI list supportable per NR inter-frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 801 may set the index through a NAS message. Alternatively, each S-NSSAI may be broadcast as the SST or SST and SST-SD list indicating the S-NSSAI list. Each S-NSSAI may be broadcast as an index indicating a specific S-NSSAI list. If each S-NSSAI may be broadcast as the index indicating the specific S-NSSAI list, the UE 801 may set the index through a NAS message.

SIB5: may broadcast the plurality of the EUTRA frequencies. Each E-UTRA inter-frequency may include one cell reselection priority information. The E-UTRA frequency may not broadcast the network slice information.

As such, the system information is broadcast from the gNB 802, and may indicate NR system information.

The UE 801 of the RRC_IDLE mode may perform the RRC connection establishment procedure with the camping-on cell in operation 820. In operation 825, the UE 801 may broadcast an RRCSetupRequest message to the gNB 802. In operation 830, the gNB 802 may transmit an RRCSetup message to the UE 801. The UE 801 receiving the RRCSetup message may apply configuration information included in the RRCSetup message in operation 830. In operation 835, the UE 801 may transit to the RRC_CONNECTED mode.

The UE 801 transiting to the RRC_CONNECTED mode in operation 835 may transmit an RRCSetupComplete message to the gNB 802. In operation 840, if an upper layer device provides one or more N-SSAI, the UE 801 may transmit the RRCSetupComplete message to the gNB 802 by including an s-NSSAI-List. Also, in operation 840, the UE 801 may transmit the RRCSetupComplete message to the gNB 802 by including a registration request message. Each S-NSSAI may include the SST or the SST and the SST-SD. The ASN.1 structure is shown in the following Table 4.

TABLE 4

S-NSSAI
The IE S-NSSAI (Single Network Slice Selection Assistance Information) identifies a Network Slice end to end
and comprises a slice/service type and a slice differentiator, see TS 23.003 [21].

S-NSSAI information element

```
-- ASN1START
-- TAG-S-NSSAI-START
S-NSSAI ::=                    CHOICE{
    sst                            BIT STRING (SIZE (8)),
    sst-SD                         BIT STRING (SIZE (32))
}
-- TAG-S-NSSAI-STOP
-- ASN1STOP
```

S-NSSAI field descriptions sst
Indicates the S-NSSAI consisting of Slice/Service Type, see TS 23.003 [21].
sst-SD
Indicates the S-NSSAI consisting of Slice/Service Type and Slice Differentiator, see TS 23.003 [21].

In operation 845, the gNB 802 may forward the registration request message to an AMF 803.

In operation 850, an NSSF 804 may select a network slice supportable by the 5GC, and transfer the selected network slice to the AMF 803.

In operation 855, the AMF 803 may transmit to the gNB 802 a registration accept message including the supportable NSSAI. The AMF 803 may transmit the registration accept message to the gNB 802 by including the NSSAI configurable to the UE 801. In addition, the AMF 803 may transmit the registration accept message to the gNB 802 by including a target NSSAI unsupportable among the NSSAI requested by the UE 801. The registration accept message may also include the RFSP index value.

In operation 860, the gNB 802 may transmit a DLInformationTransfer message to the UE 801. The DLInformationTransfer message may include the registration accept message received from the AMF 803.

In operation 865, the gNB 802 may perform the RRM based on the RFSP index received from the AMF 803.

In operation 870, the gNB 802 may transmit an RRCRelease message for migrating to a cell which supports the network slice requested by the UE 801. According to an embodiment, the RRCRelease message may include SliceCellReselectionPriorities. The RRCRelease message may include only one of CellReselectionPriorities and SliceCellReselectionPriorities. SliceCellReselectionPriorities may include FreqPriorityListNR for each S-NSSAI. Alternatively, SliceCellReselectionPriorities may include FreqPriorityListNR supporting the S-NSSAI list. SliceCellReselectionPriorities may include FreqPriorityListNR without network slice information. SliceCellReselectionPriorities may include a new timer value. SliceCellReselectionPriorities may include new FreqPriorityListEUTRA. The new FreqPriorityListEUTRA may indicate the same information as the conventional FreqPriorityListEUTRA, but may be included in SliceCellReselectionPriorities, not in CellReselectionPriorities. Each S-NSSAI may be included as the SST or the SST and the SST-SD in the RRCRelease message. Alternatively, each S-NSSAI may be broadcast as an index indicating a specific SST or SST and SST-SD. If each S-NSSAI is broadcast as the index indicating the specific SST or SST and SST-SD, the UE 801 may set the index through a NAS message. Alternatively, the SST or SST and SST-SD list indicating the S-NSSAI list where each S-NSSAI indicates the S-NSSAI list may be included in the RRCRelease message. Alternatively, each S-NSSAI may be included as an index indicating a specific S-NSSAI list in the RRCRelease message. If each S-NSSAI is broadcast as the index indicating the specific S-NSSAI list, the UE 801 may set the index through a NAS message.

If the RRCRelease message includes SliceCellReselectionPriorities, the UE 801 may store it. If the RRCRelease message includes a new timer value, the UE 801 may run a new timer based on the new timer value. While the new timer is running or the RRCRelease message does not include the new timer value, the UE 801 may perform the cell reselection based on SliceCellReselectionPriorities included in the RRCRelease message. That is, the UE 801 may ignore network slice information of the NR frequency and cell reselection priority information of the E-UTRA frequency broadcast in the system information (e.g., SIB2, SIB4, SIB5). If the new timer expires, the UE 801 may carry out the cell reselection by applying the network slice information of the NR frequency and the cell reselection priority information of the E-UTRA frequency broadcast in the system information (e.g., SIB2, SIB4, SIB5).

In operation 875, the UE 801 may perform the cell selection or the cell reselection based on the information included in the RRCRelease message or the system information.

In operation 880, the UE 801 may select or reselect an inter-RAT cell. The UE 801 may release SliceCellReselectionPriorities received in operation 870 and stop the new timer running. The UE 801 may perform the cell selection or the cell reselection based on system information broadcast from the selected or reselected inter-RAT cell. Alternatively, the UE 801 may maintain SliceCellReselectionPriorities received in operation 870 and keep running the new timer. However, the UE 801 may perform the cell selection or the cell reselection based on system information broadcast from the selected or reselected inter-RAT cell. That is, if selecting or reselecting an NR cell, the UE 801 may perform the cell selection or the cell reselection by applying SliceCellReselectionPriorities received in operation 870. Alternatively, the UE 801 may perform the cell reselection by applying FreqPriorityListEUTRA received in operation 870.

Figure 9:
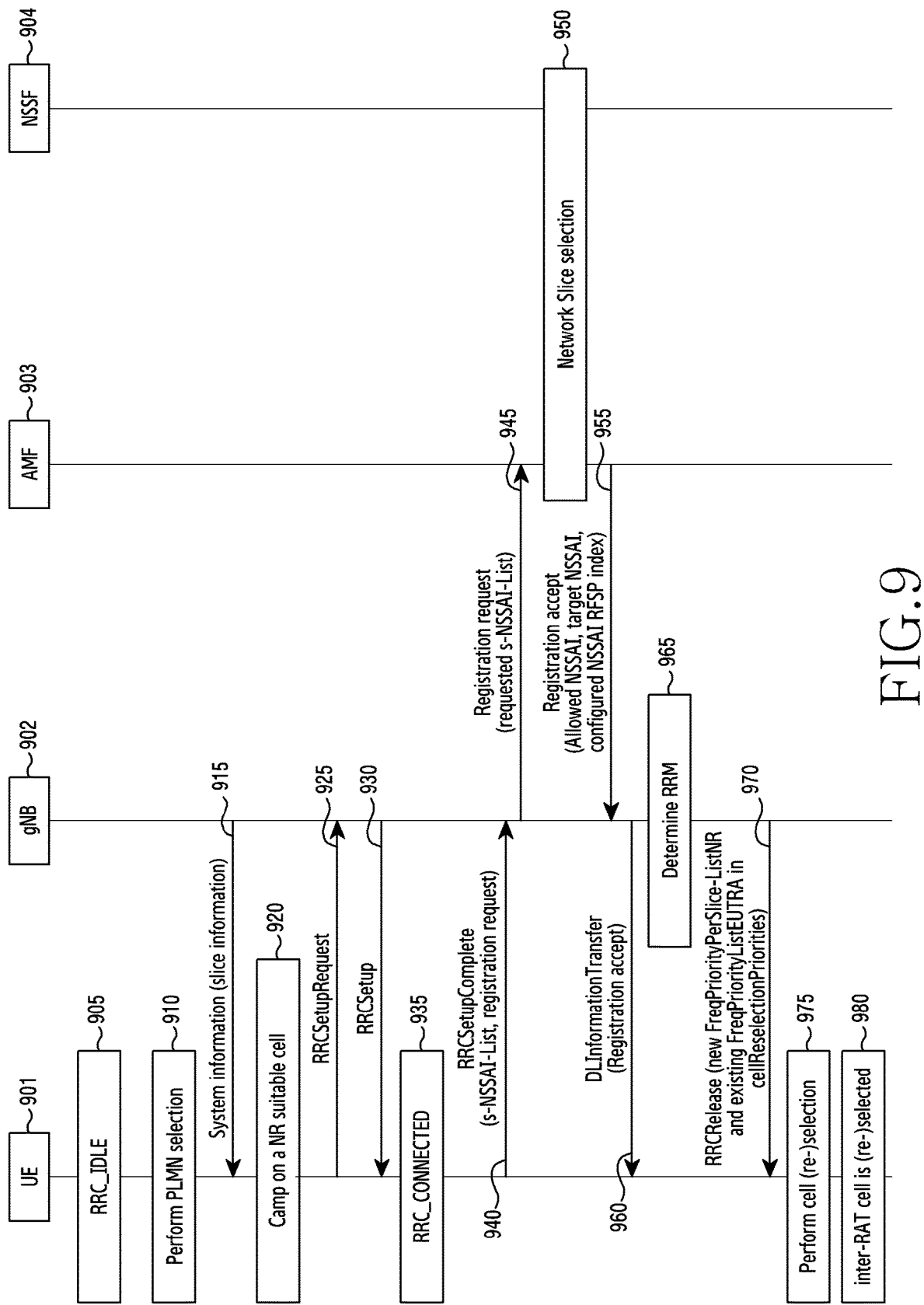
FIG. 9 illustrates still another example of signaling for reselecting a cell which supports network slice according to an embodiment of the disclosure.

FIG. 9 illustrates still another example of signaling for reselecting a cell which supports a network slice according to an embodiment of the disclosure. FIG. 9 illustrates still another signaling example for reselecting the cell which supports the network slice providing a UE's intended service.

Referring to FIG. 9, in operation 905, a UE 901 may be in the RRC_IDLE mode. The UE 901 may perform the network slice based cell reselection process. In operation 910, the UE 901 of the RRC_IDLE mode may select the PLMN. In operation 915, the UE 901 of the RRC_IDLE mode may receive system information broadcast by a gNB 902. After receiving the system information, the UE 901 may camp on a suitable cell, or an NR suitable cell through the cell selection or cell reselection. According to an embodiment, the system information may include network slice related information. For example, information included in the system information is as follows.

SIB2: may broadcast the serving NR frequency (the frequency provided by the cell currently camping on), the S-NSSAI list supportable in the NR serving frequency or the slice group, and the cell reselection priority information mapped to the S-NSSAI list. The cell reselection priority information mapped to the S-NSSAI list may indicate cellReselectionPriority and cellReselectionSubPriority(optional). Alternatively, the serving NR frequency (the frequency provided by the currently camping-on cell), the S-NSSAI list supportable in the NR serving frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 901 may set the index through a NAS message. Alternatively, each S-NSSAI may be broadcast as the SST or SST and SST-SD list indicating the S-NSSAI list, and may be broadcast as an index indicating a specific S-NSSAI list. If each S-NSSAI is broadcast as the index indicating the specific S-NSSAI list, the UE 901 may set the index through a NAS message.

SIB4: the plurality of the NR inter-frequencies, the S-NSSAI list supportable per NR inter-frequency or the slice group, and the cell reselection priority information mapped to the corresponding S-NSSAI list may be broadcast. Alternatively, the plurality of the NR inter-frequencies, the S-NSSAI list supportable per NR inter-frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 901 may set the index through a NAS message. Alternatively, each S-NSSAI may be broadcast as the SST or SST and SST-SD list indicating the S-NSSAI list, and may be broadcast as an index indicating a specific S-NSSAI list. If each S-NSSAI is broadcast as the index indicating the specific S-NSSAI list, the UE 901 may set the index through a NAS message.

SIB5: may broadcast the plurality of the EUTRA frequencies. Each E-UTRA inter-frequency may include one cell reselection priority information. The E-UTRA frequency may not broadcast the network slice information.

As such, the system information is broadcast from the gNB 902, and may indicate NR system information.

The UE 901 of the RRC_IDLE mode may perform the RRC setup procedure with the cell camping on in operation 920. In operation 925, the UE 901 may broadcast an RRCSetupRequest message to the gNB 902. In operation 930, the gNB 902 may transmit an RRCSetup message to the UE 901. The UE 901 receiving the RRCSetup message may apply configuration information included in the RRC RRCSetup message in operation 930. In operation 935, the UE 901 may transit to the RRC_CONNECTED mode.

The UE 901 transiting to the RRC_CONNECTED mode in operation 935 may transmit an RRCSetupComplete message to the gNB 902. In operation 940, if an upper layer device provides one or more N-SSAI, the UE 901 may transmit the RRCSetupComplete message to the gNB 902 by including an s-NSSAI-List. Also, in operation 940, the UE 901 may transmit the RRCSetupComplete message to the gNB 902 by including a registration request message. Each S-NSSAI may include the SST or the SST and the SST-SD. The ASN.1 structure is shown in the following Table 5.

TABLE 5

S-NSSAI
The IE S-NSSAI (Single Network Slice Selection Assistance Information) identifies a Network Slice end to end and comprises a slice/service type and a slice differentiator, see TS 23.003 [21], S-NSSAI information element -- ASN1START
-- TAG-S-NSSAI-START
S-NSSAI ::=                          CHOICE{
    sst                              BIT STRING (SIZE (8)),
    sst-SD                           BIT STRING (SIZE (32))
}
-- TAG-S-NSSAI-STOP
-- ASN1STOP S-NSSAI field descriptions sst
Indicates the S-NSSAI consisting of Slice/Service Type, see TS 23.003 [21].
sst-SD
Indicates the S-NSSAI consisting of Slice/Service Type and Slice Differentiator, see TS 23.003 [21].

In operation 945, the gNB 902 may forward the registration request message to an AMF 903.

In operation 950, an NSSF 904 may select a network slice supportable by the 5GC, and transfer the selected network slice to the AMF 903.

In operation 955, the AMF 903 may transmit to the gNB 902 a registration accept message including the supportable NSSAI. The AMF 903 may transmit the registration accept message to the gNB 902 by including the NSSAI configurable to the UE 901. In addition, the AMF 903 may transmit the registration accept message to the gNB 902 by including a target NSSAI unsupportable among the NSSAI requested by the UE 901. The registration accept message may also include the RFSP index value.

In operation 960, the gNB 902 may transmit a DLInformationTransfer message to the UE 901. The DLInformationTransfer message may include the registration accept message received from the AMF 903.

In operation 965, the gNB 902 may perform the RRM based on the RFSP index received from the AMF 903.

In operation 970, the gNB 902 may transmit an RRCRelease message for migrating to a cell which supports the network slice requested by the UE 901. According to an embodiment, the RRCRelease message may include FreqPriorityPerSlice-ListNR in CellReselectionPriorities. FreqPriorityPerSlice-ListNR may include FreqPriorityListNR for each S-NSSAI. Alternatively, FreqPriorityPerSlice-ListNR may include FreqPriorityListNR commonly supporting the S-NSSAI list. According to an embodiment, the RRCRelease message may include one of FreqPriorityListNR and FreqPriorityPerSlice-ListNR in CellReselectionPriorities. FreqPriorityPerSlice-ListNR may include FreqPriorityListNR having no network slice information. Each S-NSSAI may be included as the SST or the SST and the SST-SD in the RRCRelease message. Alternatively, each S-NSSAI may be broadcast as an index indicating a specific SST or SST and SST-SD. If each S-NSSAI is broadcast as the index indicating the specific SST or SST and SST-SD, the UE 901 may set the index through a NAS message. Alternatively, the SST or SST and SST-SD list indicating the S-NSSAI list as each S-NSSAI may be included in the RRCRelease message. Alternatively, each S-NSSAI may be included as an index indicating a specific S-NSSAI list in the RRCRelease message. If each S-NSSAI is broadcast as the index indicating the specific S-NSSAI list, the UE 901 may set the index through a NAS message.

If the RRCRelease message includes CellReselectionPriorities, the UE 901 may store it. If the RRCRelease message includes a T320 timer value, the UE 901 may run a new timer based on the T320 timer value. While the new timer is running or if the RRCRelease message does not include the T320 timer value, the UE 901 may perform the cell reselection based on CellReselectionPriorities included in the RRCRelease message. That is, the UE 901 may ignore network slice information of the NR frequency and cell reselection priority information of the E-UTRA frequency broadcast in the system information (e.g., SIB2, SIB4, SIB5). If the T320 timer expires, the UE 901 may perform the cell reselection by applying the network slice information of the NR frequency and the cell reselection priority information of the E-UTRA frequency broadcast in the system information (e.g., SIB2, SIB4, SIB5).

In operation 975, the UE 901 may perform the cell selection or the cell reselection based on the information included in the RRCRelease message or the system information.

In operation 980, the UE 901 may select or reselect an inter-RAT cell. The UE 901 may release CellReselectionPriorities received in operation 970 and stop the T320 timer running. The UE 901 may perform the cell selection or the cell reselection based on system information broadcast from the selected or reselected inter-RAT cell. Alternatively, the UE 901 may maintain CellReselectionPriorities received in operation 970 and keep running the T320 timer. However, the UE 901 may perform the cell selection or the cell reselection based on the system information broadcast from the selected or reselected inter-RAT cell. That is, if selecting or reselecting an NR cell, the UE 901 may perform the cell selection or the cell reselection by applying CellReselectionPriorities received in operation 970. Alternatively, the UE 901 may perform the cell reselection by applying only the new FreqPriorityListEUTRA received in operation 970. The UE 901 may perform the cell reselection based on system information with respect to the NR frequency. The UE 901 may apply CellReselectionPriorities received in operation 970, and perform the cell reselection by keeping the T320 timer running.

Figure 10:
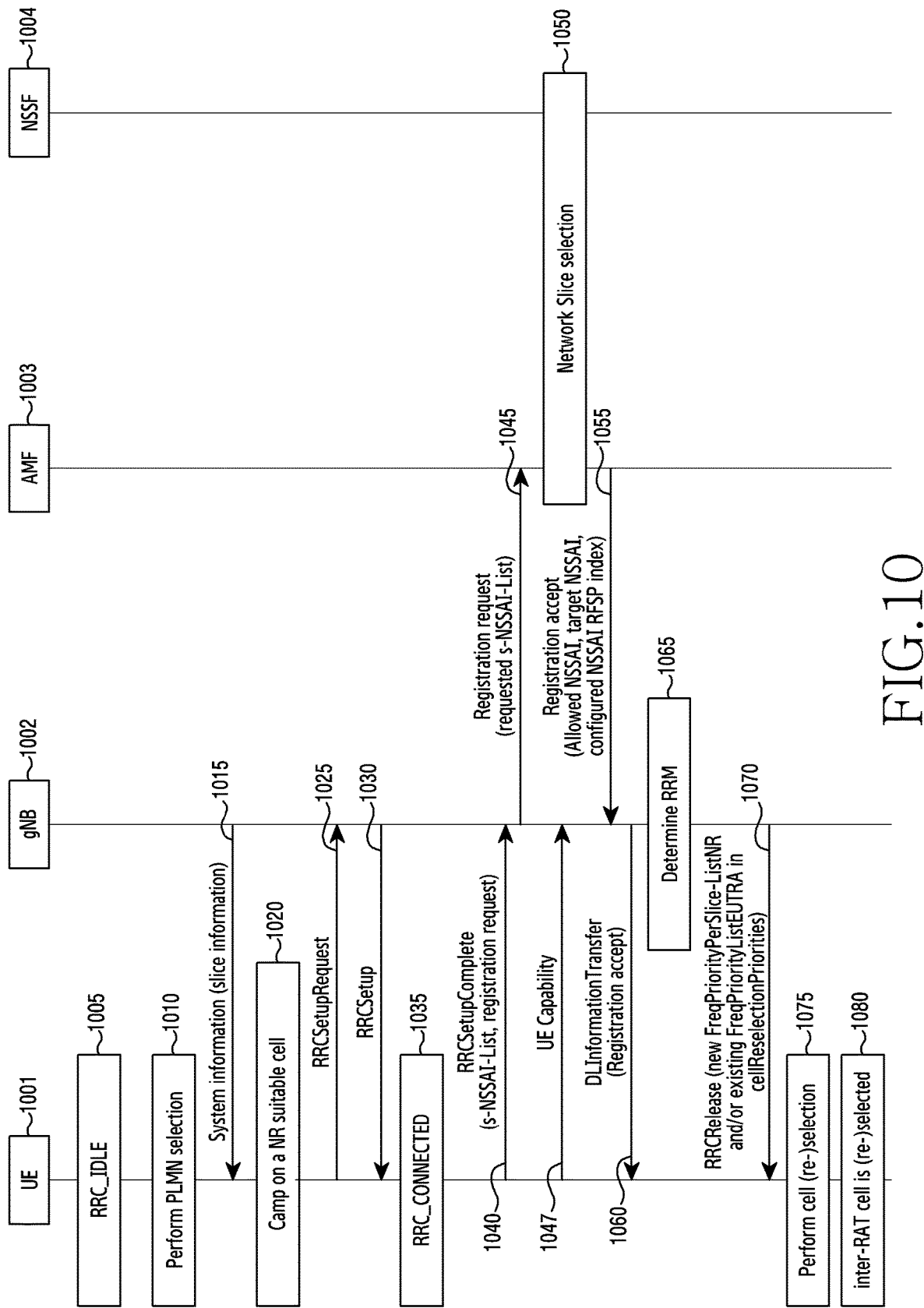
FIG. 10 illustrates a further example of signaling for reselecting a cell which supports network slice according to an embodiment of the disclosure.

FIG. 10 illustrates a further example of signaling for reselecting a cell which supports a network slice according to an embodiment of the disclosure. FIG. 10 illustrates the further signaling example for reselecting the cell which supports the network slice providing a UE's intended service.

Referring to FIG. 10, in operation 1005, a UE 1001 may be in the RRC_IDLE mode. The UE 1001 may perform the network slice based cell reselection process. In operation 1010, the UE 1001 of the RRC_IDLE mode may select the PLMN. In operation 1015, the UE 1001 of the RRC_IDLE mode may receive system information broadcast by a gNB 1002. After receiving the system information, the UE 1001 may camp on a suitable cell, or an NR suitable cell through the cell selection or cell reselection process. According to an embodiment, the system information may include network slice related information. For example, information included in the system information is as follows.

SIB2: may broadcast the serving NR frequency (the frequency provided by the cell currently camping on), the S-NSSAI list supportable in the NR serving frequency or the slice group, and the cell reselection priority information mapped to the S-NSSAI list. The cell reselection priority information mapped to the S-NSSAI list may indicate cellReselectionPriority and cellReselectionSubPriority(optional). Alternatively, the serving NR frequency (the frequency of the currently camping-on cell), the S-NSSAI list supportable in the NR serving frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 1001 may set the index through a NAS message. Alternatively, each S-NSSAI may be broadcast as the SST or SST and SST-SD list indicating the S-NSSAI list, and may be broadcast as an index indicating a specific S-NSSAI list. If each S-NSSAI is broadcast as the index indicating the specific S-NSSAI list, the UE 1001 may set the index through a NAS message.

SIB4: the plurality of the NR inter-frequencies, the S-NSSAI list supportable per NR inter-frequency or the slice group, and the cell reselection priority information mapped to the corresponding S-NSSAI list may be broadcast. Alternatively, the plurality of the NR inter-frequencies, the S-NSSAI list supportable per NR inter-frequency, and the cell reselection priority information mapped to each S-NSSAI may be broadcast. Each S-NSSAI may be broadcast as the SST or the SST and the SST-SD. Alternatively, each S-NSSAI may be broadcast as an index indicating a specific SST or SST and SST-SD. If each S-NSSAI is broadcast as the index indicating the specific SST or SST and SST-SD, the UE 1001 may set the index through a NAS message. Alternatively, each S-NSSAI may be broadcast as the SST or SST and SST-SD list indicating the S-NSSAI list, and may be broadcast as an index indicating a specific S-NSSAI list. If each S-NSSAI is broadcast as the index indicating the specific S-NSSAI list, the UE 1001 may set the index through a NAS message.

SIB5: may broadcast a plurality of EUTRA frequencies, and each E-UTRA inter-frequency may include one cell reselection priority information. The E-UTRA frequency may not broadcast the network slice information.

As such, the system information is broadcast from the gNB 1002, and may indicate NR system information.

The UE 1001 of the RRC_IDLE mode may perform the RRC setup procedure with the cell camping on in operation 1020. In operation 1025, the UE 1001 may broadcast an RRCSetupRequest to the gNB 1002. In operation 1030, the gNB 1002 may transmit an RRCSetup message to the UE 1001. The UE 1001 receiving the RRCSetup message may apply configuration information included in the RRCSetup message in operation 1030. In operation 1035, the UE 1001 may transit to the RRC_CONNECTED mode.

The UE 1001 transiting to the RRC_CONNECTED mode in operation 1035 may transmit an RRCSetupComplete message to the gNB 1002. In operation 1040, if an upper layer device provides one or more N-SSAI, the UE 1001 may transmit the RRCSetupComplete message to the gNB 1002 by including an s-NSSAI-List. Also, in operation 1040, the UE 1001 may transmit the RRCSetupComplete message to the gNB 1002 by including a registration request message. Each S-NSSAI may include the SST or the SST and the SST-SD. The ASN.1 structure is shown in the following Table 6.

In operation 1055, the AMF 1003 may transmit to the gNB 1002 a registration accept message including the supportable NSSAI. The AMF 1003 may transmit the registration accept message to the gNB 1002 by including the NSSAI configurable to the UE 1001. In addition, the AMF 1003 may transmit the registration accept message to the gNB 1002 by including an unsupportable NSSAI (target NSSAI) among the NSSAI requested by the UE 1001. The registration accept message may also include the RFSP index value.

In operation 1060, the gNB 1002 may transmit a DLInformationTransfer message to the UE 1001. The DLInformationTransfer message may include the registration accept message received from the AMF 1003.

In operation 1065, the gNB 1002 may perform the RRM based on the RFSP index received from the AMF 1003. According to an embodiment, the gNB 1002 may perform the RRM, based on the received capability information of the UE 1001.

In operation 1070, the gNB 1002 may transmit an RRCRelease message for migrating to a cell which supports the network slice requested by the UE 1001, based on the capability information received from the UE 1001. According to an embodiment, if the UE 1001 supports the network slice, the RRCRelease message may include FreqPriorityPerSlice-ListNR. FreqPriorityPerSlice-ListNR may include FreqPriorityListNR for each S-NSSAI. Alternatively, FreqPriorityPerSlice-ListNR may include FreqPriorityListNR commonly supporting the S-NSSAI list. According to an embodiment, if the UE 1001 does not support the network slice, the RRCRelease message may include FreqPriorityListNR. In other words, FreqPriorityPerSlice-

TABLE 6

S-NSSAI
The IE S-NSSAI (Single Network Slice Selection Assistance Information) identifies a Network Slice end to end and comprises a slice/service type and a slice differentiator, see TS 23.003 [21].

S-NSSAI information element

-- ASN1START
-- TAG-S-NSSAI-START
S-NSSAI ::=                CHOICE{
    sst                    BIT STRING (SIZE (8)),
    sst-SD                 BIT STRING (SIZE (32))
}
-- TAG-S-NSSAI-STOP
-- ASN1STOP S-NSSAI field descriptions sst
Indicates the S-NSSAI consisting of Slice/Service Type, see TS 23.003 [21].
sst-SD
Indicates the S-NSSAI consisting of Slice/Service Type and Slice Differentiator, see TS 23.003 [21].

In operation 1045, the gNB 1002 may forward the registration request message to an AMF 1003.

In operation 1047, the UE 1001 may transmit UE capability information to the gNB 1002. Herein, the capability information may include information of whether the UE 1001 supports the network slice. In addition, it is illustrated that, but not limited to, the capability information is transmitted from the UE 1001 to the gNB 1002 after operation 1045 of forwarding the registration request message from the gNB 1002 to the AMF 1003 by way of example. After operation 1040, the UE 1001 may transmit the capability information to the gNB 1002.

In operation 1050, an NSSF 1004 may select a network slice supportable by the 5GC, and transfer the selected network slice to the AMF 1003.

ListNR may indicate FreqPriorityListNR without the network slice information. Each S-NSSAI may be included as the SST or the SST and the SST-SD in the RRCRelease message. Alternatively, each S-NSSAI may be broadcast as an index indicating a specific SST or SST and SST-SD. If each S-NSSAI is broadcast as the index indicating the specific SST or SST and SST-SD, the UE 1001 may set the index through a NAS message. Alternatively, each S-NSSAI may be broadcast as the SST or SST and SST-SD list indicating the S-NSSAI list the RRCRelease message. Alternatively, each S-NSSAI may be included as an index indicating a specific S-NSSAI list in the RRCRelease message. If each S-NSSAI is broadcast as the index indicating the specific S-NSSAI list, the UE 1001 may set the index through a NAS message.

If the RRCRelease message includes CellReselectionPriorities, the UE 1001 may store it. If the RRCRelease message includes a T320 timer value, the UE 1001 may run a new timer based on the T320 timer value. While the new timer is running or if the RRCRelease message does not include the T320 timer value, the UE 1001 may perform the cell reselection based on CellReselectionPriorities included in the RRCRelease message. That is, the UE 1001 may ignore network slice information of the NR frequency and cell reselection priority information of the E-UTRA frequency broadcast in the system information (e.g., SIB2, SIB4, SIB5). If the T320 timer expires, the UE 1001 may carry out the cell reselection by applying the network slice information of the NR frequency and the cell reselection priority information of the E-UTRA frequency broadcast in the system information (e.g., SIB2, SIB4, SIB5).

In operation 1075, the UE 1001 may perform the cell selection or the cell reselection based on the information included in the RRCRelease message or the system information.

In operation 1080, the UE 1001 may select or reselect an inter-RAT cell. The UE 1001 may release CellReselectionPriorities received in operation 1070 and stop the T320 timer running. The UE 1001 may perform the cell selection or the cell reselection based on system information broadcast from the selected or reselected inter-RAT cell. Alternatively, the UE 1001 may maintain CellReselectionPriorities received in operation 1070 and keep running the T320 timer. However, the UE 1001 may perform the cell selection or the cell reselection based on the system information broadcast from the selected or reselected inter-RAT cell. That is, if selecting or reselecting an NR cell, the UE 1001 may perform the cell selection or the cell reselection by applying CellReselectionPriorities received in operation 1070. Alternatively, the UE 1001 may perform the cell reselection by applying only the new FreqPriorityListEUTRA received in operation 1070. The UE 1001 may perform the cell reselection based on the system information with respect to the NR frequency. In addition, the UE 1001 may apply CellReselectionPriorities received in operation 1070, and perform the cell reselection by keeping the T320 timer running.

Figure 11:
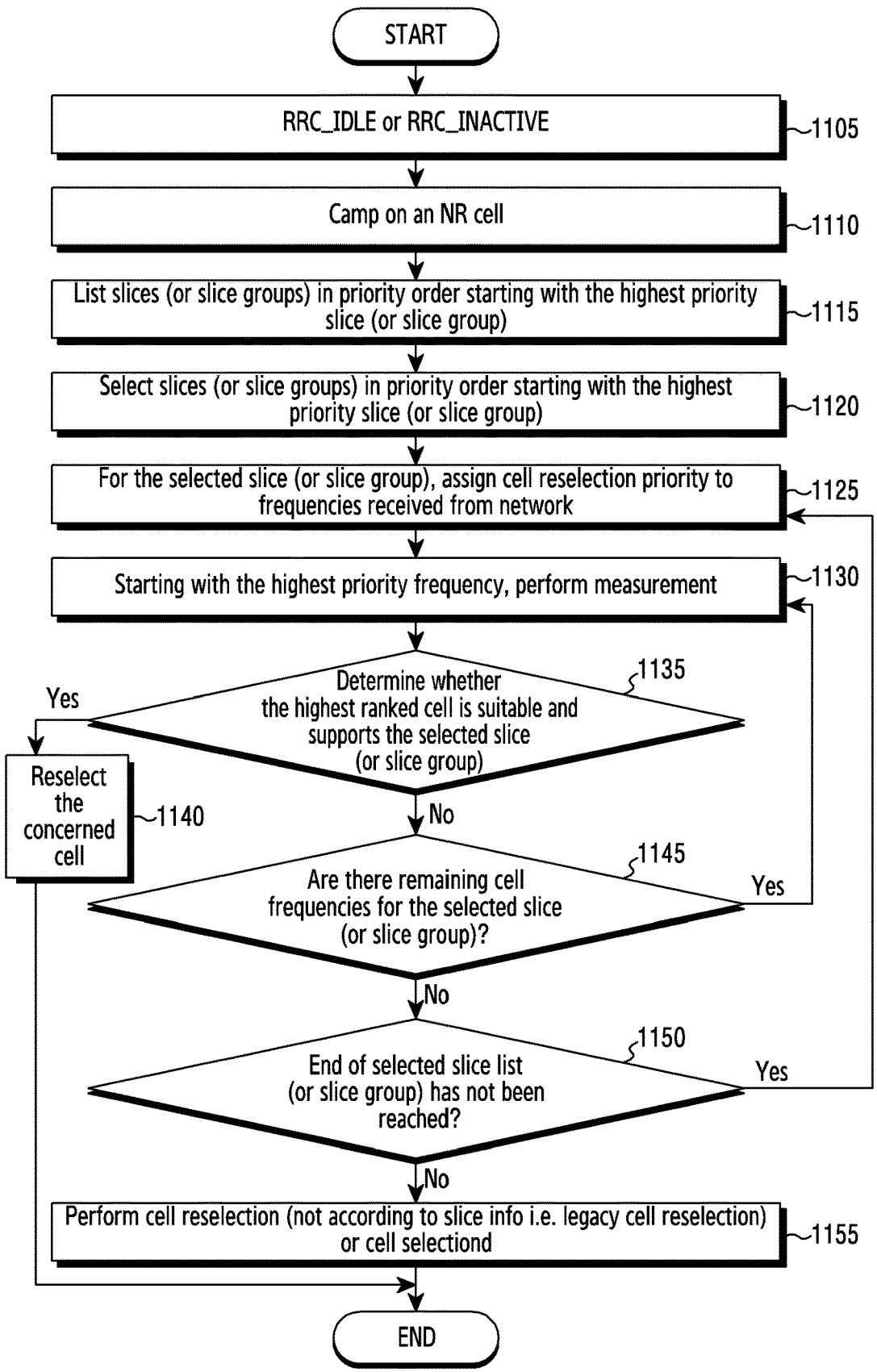
FIG. 11 illustrates an example of a flowchart of user equipment operations for reselecting a cell which supports network slice according to an embodiment of the disclosure.

FIG. 11 illustrates an example of a flowchart of UE operations for reselecting a cell which supports a network slice according to an embodiment of the disclosure.

According to an embodiment, the UE may first perform the cell reselection evaluation process on network slices or network slice groups of high priorities. In addition, the UE may first perform the cell reselection evaluation process on a frequency of a high cell reselection priority among a plurality of frequencies supporting the network slices or network slice groups of the high priorities. That is, the UE may first perform the frequency of the high cell reselection priority among the plurality of the frequencies supporting the network slices or network slice groups of the high priorities, and determine whether to reselect the cell based on a cell reselection criterion.

Referring to FIG. 11, in operation 1105, the UE may be in the RRC_IDLE mode or the RRC INACTIVE mode.

In operation 1110, the UE may camp on an NR cell through the cell selection process. The camping-on cell may be referred to as a serving cell. The UE may receive or obtain system information broadcast by the serving cell.

According to an embodiment, the UE may reselect a cell through the cell reselection evaluation process. In operation 1115, the UE may list network slices (or network slice groups) in descending order of the network slice priority (or the network slice group priority). For example, if a priority of a first network slice is 3, a priority of a second network slice is 2, and a priority of a third network slice is 4, the UE may list the third network slice, the first network slice, and the second network slice in order. Herein, a network slice of a great priority may be a network slice having a higher priority. However, the disclosure is not limited thereto, and a network slice of a small priority may be a network slice having a higher priority. The network slice priority or the network slice group priority of the UE may be set from the NAS layer device. Alternatively, the network slice priority or the network slice group priority of the UE may be set from the system information or RRCRelease broadcast by the gNB. Alternatively, the network slice priority or the network slice group priority of the UE may be preset in the UE.

In operation 1120, the UE may select network slices in descending order of the priority (or network slice groups in descending order of the priority). For example, the UE may first select the network slice of the highest priority. Next, performing operation 1102 may indicate selecting the network slice of the second highest priority.

In operation 1125, the UE may assign the cell reselection priority received from the gNB to one or more frequencies, with respect to the network slices or the network slice groups selected in operation 1120. For example, if the UE selects the third network slice in operation 1120 and the first frequency, the second frequency supports the third network slice, and the gNB provides the UE with the cell reselection priority of 5 for the first frequency and the cell reselection priority of 3 for the second frequency, the UE may assign the cell reselection priority of 5 for the first frequency and the cell reselection priority of 3 for the second frequency.

In operation 1130, the UE may perform measurement in descending order of the cell reselection priority. According to an embodiment, the UE may measure the frequencies in descending order of the cell reselection priority based on details defined in 3GPP specification 38.304. For example, if the cell reselection priority of the frequency of the serving cell of the UE is 2, the UE may measure only the first frequency. Herein, the details defined in 3GPP specification 38.304 may indicate clause 4.2.4.2. The cell reselection priority may be set from the gNB to the UE through the system information or the RRCRelease message.

In operation 1135, the UE may determine whether a cell reselection criterion is satisfied, and whether there is a cell supporting the network slice or the network slice group selected in operation 1120. For example, the UE may determine whether the highest ranked cell is a suitable cell, and whether the corresponding cell supports the network slice or the network slice group selected in operation 1120 based on the details defined in 3GPP specification 38.304. Herein, the details defined in 3GPP specification 38.304 may indicate clauses 5.2.4.5 and 5.2.4.6.

If the highest ranked cell is the suitable cell and supports the network slice or the network slice group selected in operation 1120, the UE may reselect the corresponding cell and may not perform the remaining operations, in operation 1140.

If the highest ranked cell is not the suitable cell and does not support the network slice (or the network slice group) selected in operation 1120, the UE may identify whether there remains the frequency assigned the cell reselection priority in operation 1125, in operation 1145. If there remains the frequency assigned the cell reselection priority in operation 1125, the UE may return to and perform operation 1130. Herein, the remaining frequency assigned the cell reselection priority may indicate a frequency which does not measure the frequency assigned the cell reselection priority or a frequency which is not identified whether the cell reselection criterion is satisfied. For example, it may indicate that operations starting from operation 1130 are performing on the second frequency. If there remains no frequency assigned the cell reselection priority in operation 1125, the UE may perform operation 1150.

In operation 1150, the UE may determine whether the network slices or the network slice groups listed in operation 1115 include the network slice or the network slice group not selected. As mentioned in operation 1120, the UE may select the network slice having the highest priority (or the network slice group having the highest priority) in operation 1120. Hence, the UE may select the network slice having the second highest priority (or the network slice group having the second highest priority), in operation 1150. In operation 1150, if the network slices (or the network slice groups) listed in operation 1115 include the network slice (or the network slice group) not selected, the UE may return to operation 1120.

In operation 1155, if determining that all the network slices or the network slice groups listed in operation 1115 are selected in operation 1150, the UE may perform the legacy cell reselection evaluation process without performing the network slice based cell reselection evaluation process. That is, the UE may reselect the cell by performing the cell reselection evaluation process without considering the network slice. Alternatively, the UE may perform the cell selection.

Figure 12:
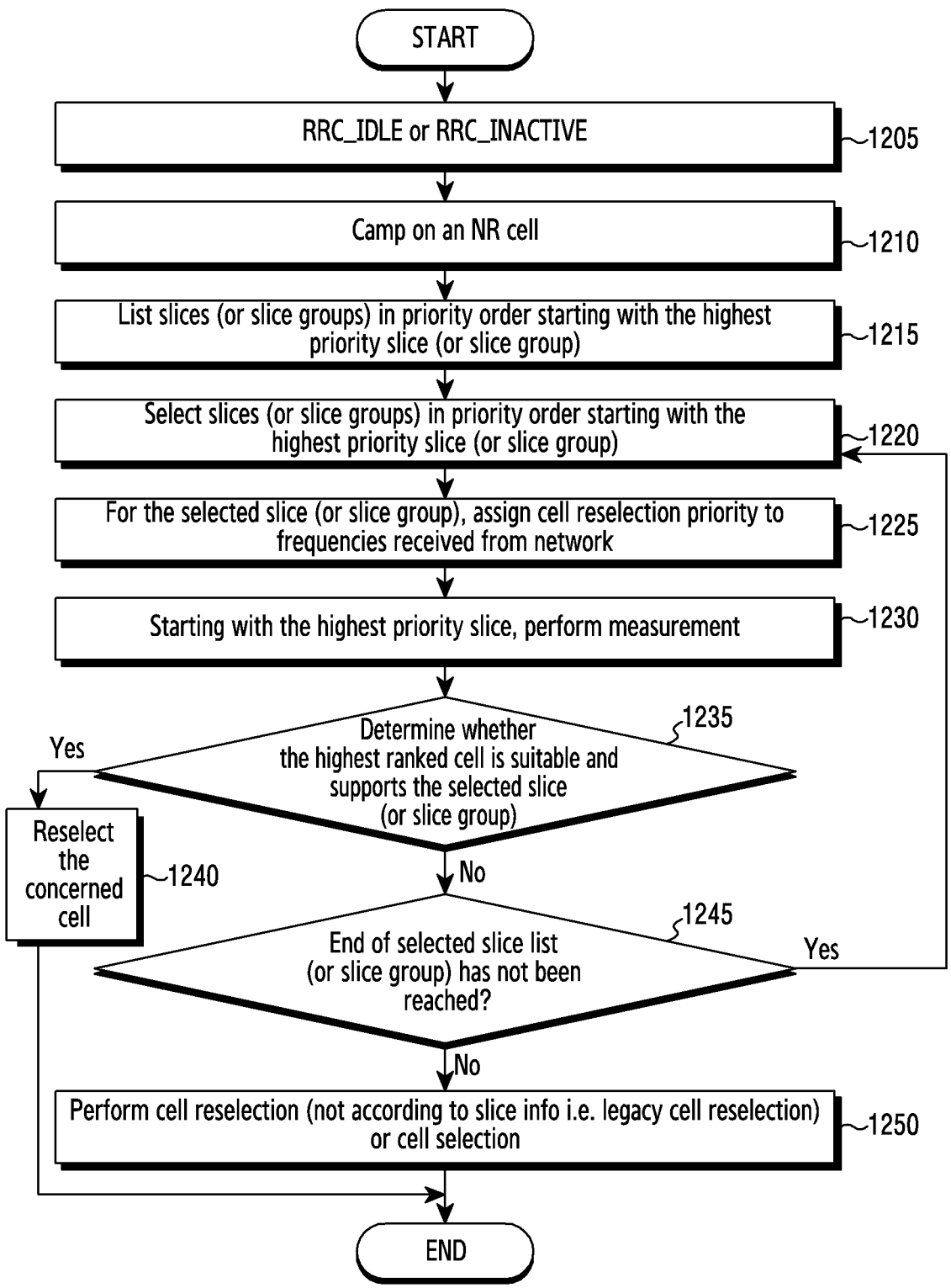
FIG. 12 illustrates another example of a flowchart of user equipment operations for reselecting a cell which supports network slice according to an embodiment of the disclosure.

FIG. 12 illustrates another example of a flowchart of UE operations for reselecting a cell which supports a network slice according to an embodiment of the disclosure.

According to an embodiment, the UE may first perform the cell reselection evaluation process on network slices or network slice groups of high priorities. In addition, the UE may first perform the cell reselection evaluation process on every frequency supporting the network slices or network slice groups of the high priorities. That is, the UE may first perform one or more frequencies supporting the network slices or the network slice groups of the high priorities, and determine whether to reselect the cell based on the cell reselection criterion.

Referring to FIG. 12, in operation 1205, the UE may be in the RRC_IDLE mode or the RRC INACTIVE mode.

In operation 1210, the UE may camp on an NR cell through the cell selection process. The camping-on cell may be referred to as a serving cell. The UE may receive or obtain system information broadcast by the serving cell.

According to an embodiment, the UE may reselect a cell through the cell reselection evaluation process. In operation 1215, the UE may list network slices (or network slice groups) in descending order of the network slice priority (or the network slice group priority). For example, if a priority of a first network slice is 3, a priority of a second network slice is 2, and a priority of a third network slice is 4, the UE may list the third network slice, the first network slice, and the second network slice in order. Herein, a network slice of a great priority may be a network slice of a higher priority. However, the disclosure is not limited thereto, and a network slice of a small priority may be a network slice having a higher priority. The network slice priority or the network slice group priority of the UE may be set from the NAS layer device. Alternatively, the network slice priority or the network slice group priority of the UE may be set from the system information or RRCRelease broadcast by the gNB. Alternatively, the network slice priority or the network slice group priority of the UE may be preset in the UE.

In operation 1220, the UE may select network slices in descending order of the priority (or network slice groups in descending order of the priority). For example, the UE may first select the network slice of the highest priority. Next, re-performing operation 1202 may indicate selecting the network slice of the second highest priority.

In operation 1225, the UE may assign the cell reselection priority received from the gNB to one or more frequencies, with respect to the network slice or the network slice group selected in operation 1220. For example, if the UE selects a third network slice in operation 1220, the first frequency and the second frequency supports the third network slice, and the gNB provides the UE with the cell reselection priority of 5 for the first frequency and the cell reselection priority of 3 for the second frequency, the UE may assign the cell reselection priority of 5 for the first frequency and the cell reselection priority of 3 for the second frequency.

In operation 1230, the UE may measure the network slice (or the network slice group) in descending order of the cell reselection priority. According to an embodiment, the UE may measure frequencies supporting the network slice (or the network slice group) in descending order of the priority based on the details defined in 3GPP specification 38.304. For example, the UE may measure the frequency of the serving cell of the UE, the first frequency, and the second frequency. Herein, the details defined in 3GPP specification 38.304 may indicate clause 4.2.4.2. The cell reselection priority may be set from the gNB to the UE through the system information or the RRCRelease message.

In operation 1235, the UE may determine whether a cell reselection criterion is satisfied, and whether there is a cell supporting the network slice or the network slice group selected in operation 1220. For example, the UE may determine whether the highest ranked cell is a suitable cell, and whether the corresponding cell supports the network slice or the network slice group selected in operation 1220 based on the details defined in 3GPP specification 38.304. Herein, the details defined in 3GPP specification 38.304 may indicate clauses 5.2.4.5 and 5.2.4.6.

In operation 1240, if the highest ranked cell is the suitable cell and supports the network slice or the network slice group selected in operation 1220, the UE may reselect the corresponding cell and may not perform the remaining operations.

In operation 1235, if the highest ranked cell is not the suitable cell and does not support the network slice or the network slice group selected in operation 1220, the UE may determine whether there is a network slice or a network slice group unselected among the network slices or the network slice groups listed in operation 1215, in operation 1245. If the network slice list or the network slice group list listed in operation 1215 includes the network slice or network slice group unselected, the UE may return to operation 1220.

In operation 1250, if determining that all the network slices or the network slice groups listed in operation 1215 are selected in operation 1245, the UE may perform the legacy cell reselection evaluation process without performing the network slice based cell reselection evaluation process. That is, the UE may reselect the cell by performing the cell reselection evaluation process without considering the network slice. Alternatively, the UE may perform the cell selection.

Figure 13:
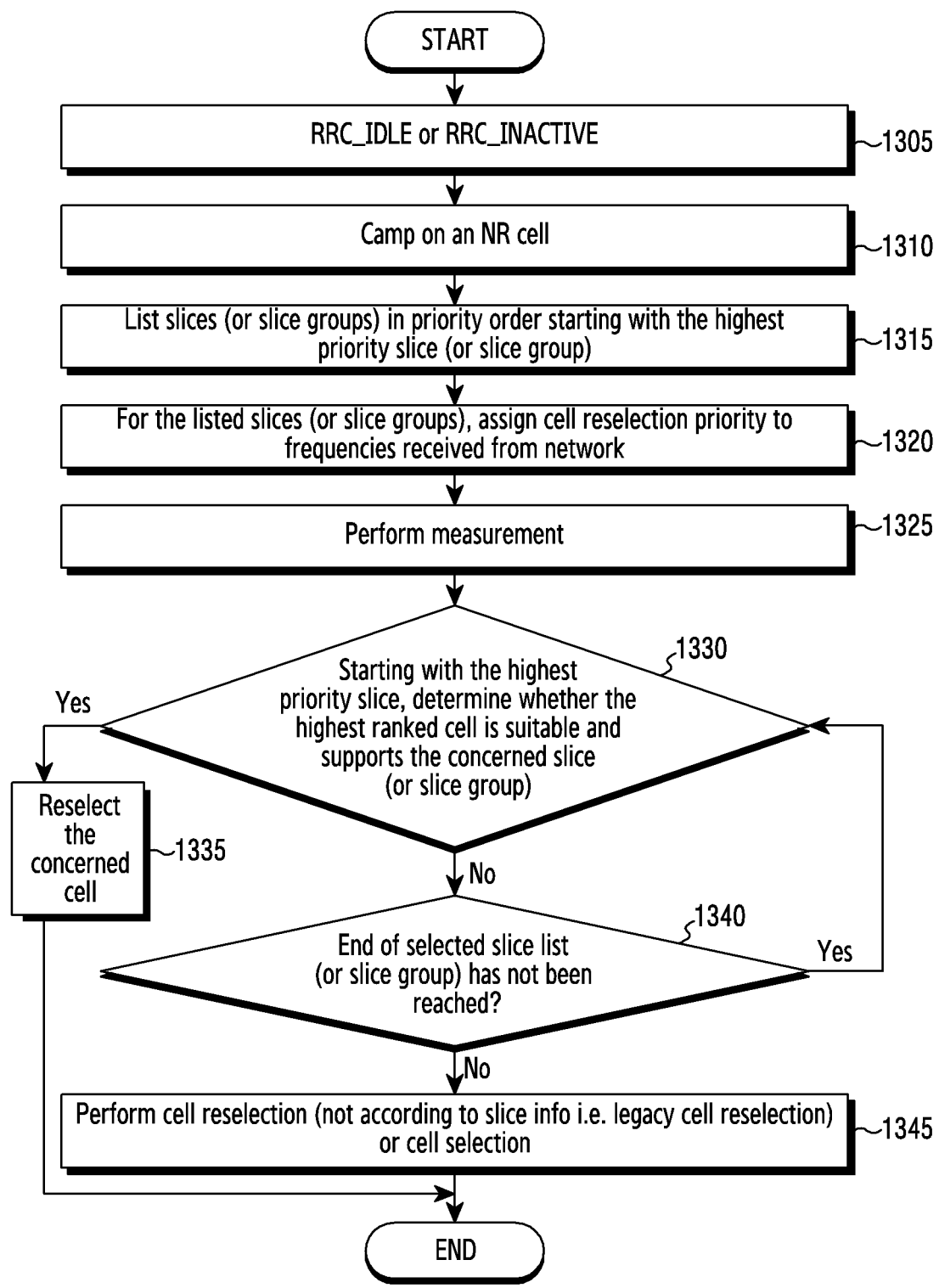
FIG. 13 illustrates yet another example of a flowchart of user equipment operations for reselecting a cell which supports network slice according to an embodiment of the disclosure.

FIG. 13 illustrates yet another example of a flowchart of UE operations for reselecting a cell which supports a network slice according to an embodiment of the disclosure.

According to an embodiment, the UE may measure every frequency supporting network slices listed or a network slice group list. In addition, the UE may determine whether to reselect a cell by applying the cell reselection evaluation criterion to the network slices or the network slice groups in descending order of the priority.

Referring to FIG. 13, in operation 1305, the UE may be in the RRC_IDLE mode or the RRC INACTIVE mode.

In operation 1310, the UE may camp on an NR cell through the cell selection process. The camping-on cell may be referred to as a serving cell. The UE may receive or obtain system information broadcast by the serving cell.

According to an embodiment, the UE may reselect a cell through the cell reselection evaluation process. In operation 1315, the UE may list network slices (or network slice groups) in descending order of the network slice priority (or the network slice group priority). For example, if a priority of a first network slice is 3, a priority of a second network slice is 2, and a priority of a third network slice is 4, the UE may list the third network slice, the first network slice, and the second network slice in order. Herein, a network slice of a great priority may be a network slice having a higher priority. However, the disclosure is not limited thereto, and a network slice of a small priority may be a network slice having a higher priority. The network slice priority or the network slice group priority of the UE may be set from the NAS layer device. Alternatively, the network slice priority or the network slice group priority of the UE may be set from the system information or RRCRelease broadcast by the gNB. Alternatively, the network slice priority or the network slice group priority of the UE may be preset in the UE.

In operation 1320, the UE may assign the cell reselection priority received from the gNB to one or more frequencies, with respect to one or more network slices (or the network slice groups) listed. For example, if listing the first network slice, the second network slice, and the third network slice in operation 1315, the UE may assign the cell reselection priority to frequencies supporting the respective network slices.

In operation 1325, the UE may perform frequency measurement.

According to an embodiment, the UE may perform the frequency measurement, based on the details defined in 3GPP specification 38.304. Herein, the details defined in 3GPP specification 38.304 may indicate the clause 4.2.4.2. The cell reselection priority may be set from the gNB to the UE through the system information or the RRCRelease message. According to an embodiment, the UE may measure every frequency supporting the network slice (or the network slice group) for each network slice (or network slice group) listed.

In operation 1330, the UE may determine whether there is a cell satisfying a network slice or network slice cell reselection criterion having the highest priority in operation 1315, and supporting a concerned network slice or network slice group. Herein, if the cell reselection criterion is applied to the network slice or the network slice group having the highest priority, the concerned network slice or network slice group may be the network slice or network slice group having the highest priority. If the cell reselection criterion is applied to the network slice or the network slice group having the second highest priority, the concerned network slice or network slice group may be the network slice or network slice group having the second highest priority. That is, the UE may determine whether the highest ranked cell supporting the concerned network slice or network slice group is a suitable cell. Herein, the details defined in 3GPP specification 38.304 may indicate the clauses 5.2.4.5 and 5.2.4.6.

If the highest ranked cell is the suitable cell in operation 1330 and supports the concerned network slice or network slice group in operation 1330, the UE may reselect the corresponding cell and may not perform the remaining operations in operation 1335.

In operation 1340, if the highest ranked cell is not the suitable cell and does not support the concerned network slice or network slice group in operation 1330, the UE may determine whether the network slices or the network slice groups listed in operation 1320 include a network slice or a network slice group not selected. If the network slice list or the network slice group list listed in operation 1315 include the network slice or the network slice group not selected in operation 1340, the UE may return to operation 1330.

In operation 1345, if performing the cell reselection evaluation process on every network slice or network slice group listed in operation 1315 in operation 1340, the UE may perform the legacy cell reselection evaluation process without performing the network slice based cell reselection evaluation process. That is, the UE may reselect the cell by performing the cell reselection evaluation process without considering the network slice. Alternatively, the UE may perform the cell selection.

Figure 14:
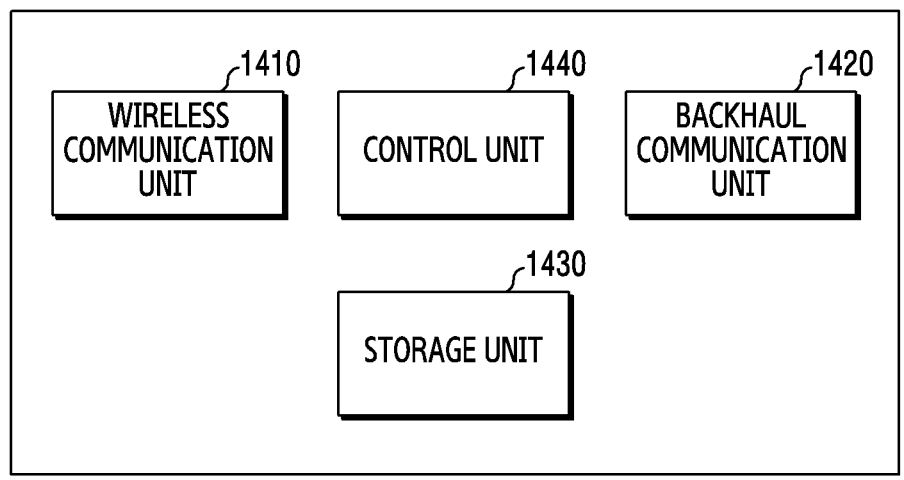
FIG. 14 illustrates a functional configuration of a base station in a wireless communication system according to an embodiment of the disclosure.

FIG. 14 illustrates a functional configuration of a base station in a wireless communication system according to an embodiment of the disclosure. The configuration shown in FIG. 14 may be understood as the configuration of the gNB 105, 110, 115, 120, 310, or 330. A term such as ' . . . unit' or ' ~er' used hereafter indicates a unit for processing at least one function or operation, and may be implemented using hardware, software, or a combination of hardware and software.

Referring to FIG. 14, the base station includes a wireless communication unit 1410, a backhaul communication unit 1420, a storage unit 1430, and a control unit 1440.

The wireless communication unit 1410 performs functions for transmitting and receiving signals over the radio channel. For example, the wireless communication unit 1410 performs a conversion function between a baseband signal and a bit string according to a physical layer standard of the system. For example, in data transmission, the wireless communication unit 1410 generates complex symbols by encoding and modulating a transmit bit string. In addition, in data reception, the wireless communication unit 1410 restores a received bit string by demodulating and decoding a baseband signal.

In addition, the wireless communication unit 1410 upconverts a baseband signal into a radio frequency (RF) band signal and then transmits it via an antenna, and downconverts an RF band signal received via the antenna into a baseband signal. For doing so, the wireless communication unit 1410 may include a transmit filter, a receive filter, an amplifier, a mixer, an oscillator, a digital to analog convertor (DAC), an analog to digital convertor (ADC), and the like. In addition, the wireless communication unit 1410 may include a plurality of transmit/receive paths. Further, the wireless communication unit 1410 may include at least one antenna array including a plurality of antenna elements.

In terms of hardware, the wireless communication unit 1410 may include a digital unit and an analog unit, and the analog unit may include a plurality of sub-units according to an operating power, an operating frequency and so on. The digital unit may be implemented with at least one processor (e.g., a digital signal processor (DSP)).

The wireless communication unit 1410 transmits and receives the signals as stated above. Hence, whole or part of the wireless communication unit 1410 may be referred to as 'a transmitter', 'a receiver', or 'a transceiver'. Also, in the following, the transmission and the reception over the radio channel is used as the meaning which embraces the above-stated processing of the wireless communication unit 1410.

The backhaul communication unit 1420 provides an interface for communicating with other nodes in the network. Herein, the other node may be the MME 125, the S-GW 130, or the NR CN 305. Also, the other node may indicate the AMF 603, 703, 803, 903, or 1003 of FIG. 6 through FIG. 10. That is, the backhaul communication unit 1420 converts a bit sting transmitted from the base station to the other node, for example, other access node, another base station, an upper node, or a core network, into a physical signal, and converts a physical signal received from the other node into a bit string.

The storage unit 1430 stores a basic program for operating the base station, an application program, and data such as setting information. The storage unit 1430 may include a volatile memory, a non-volatile memory, or a combination of a volatile memory and a non-volatile memory. The storage unit 1430 provides the stored data at a request of the control unit 1440.

The control unit 1440 controls general operations of the base station. For example, the control unit 1440 transmits and receives signals through the wireless communication unit 1410 or the backhaul communication unit 1420. Also, the control unit 1440 records and reads data in and from the storage unit 1430. The control unit 1440 may execute the functions of the protocol stack requested by the communication standard. According to another embodiment, the protocol stack may be included in the wireless communication unit 1410. For doing so, the control unit 1440 may include at least one processor. According to various embodiments, the control unit 1440 may control the base station to carry out operations according to the various embodiments described above.

Figure 15:
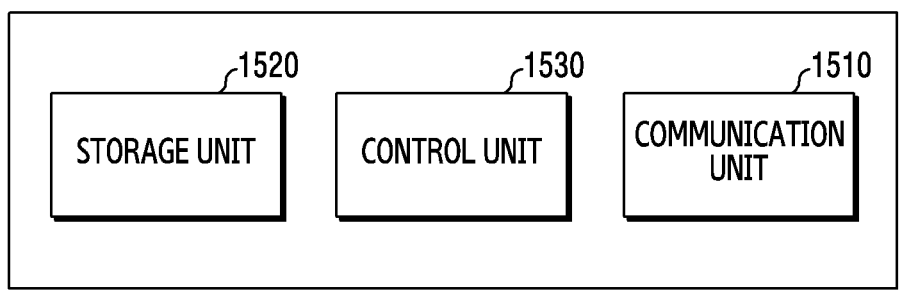
FIG. 15 illustrates a functional configuration of a user equipment in a wireless communication system according to an embodiment of the disclosure.

FIG. 15 illustrates a functional configuration of a terminal in a wireless communication system according to an embodiment of the disclosure. The configuration shown in FIG. 15 may be understood as the configuration of the UE 135 or 315. A term such as ' . . . unit' or ' ~er' used hereafter indicates a unit for processing at least one function or operation, and may be implemented using hardware, software, or a combination of hardware and software.

Referring to FIG. 15, the terminal includes a communication unit 1510, a storage unit 1520, and a control unit 1530.

The communication unit 1510 performs functions for transmitting and receiving signals over the radio channel. For example, the communication unit 1510 performs a conversion function between a baseband signal and a bit string according to the physical layer standard of the system. For example, in data transmission, the communication unit 1510 generates complex symbols by encoding and modulating a transmit bit string. In addition, in data reception, the communication unit 1510 restores a received bit string by demodulating and decoding a baseband signal. In addition, the communication unit 1510 upconverts a baseband signal into an RF band signal and then transmits it via an antenna, and down-converts an RF band signal received via the antenna into a baseband signal. For example, the communication unit 1510 may include a transmit filter, a receive filter, an amplifier, a mixer, an oscillator, a DAC, an ADC, and the like.

In addition, the communication unit 1510 may include a plurality of transmit/receive paths. Further, the communication unit 1510 may include at least one antenna array including a plurality of antenna elements. In terms of the hardware, the communication unit 1510 may include digital circuitry and analog circuitry (e.g., an RF integrated circuit (RFIC)). Herein, the digital circuitry and the analog circuitry may be implemented as a single package. Also, the communication unit 1510 may include a plurality of RF chains. Further, the communication unit 1510 may perform the beamforming.

The communication unit 1510 transmits and receives the signals as stated above. Hence, whole or part of the communication unit 1510 may be referred to as 'a transmitter', 'a receiver', or 'a transceiver'. Also, the transmission and the reception over the radio channel is used as the meaning which embraces the above-stated processing of the communication unit 1510 in the following explanations.

The storage unit 1520 stores a basic program for operating the terminal, an application program, and data such as setting information. The storage unit 1520 may include a volatile memory, a non-volatile memory, or a combination of a volatile memory and a non-volatile memory. The storage unit 1520 provides the stored data at a request of the control unit 1530.

The control unit 1530 controls general operations of the terminal. For example, the control unit 1530 transmits and receives signals through the communication unit 1510. Also, the control unit 1530 records and reads data in and from the storage unit 1520. The control unit 1530 may execute the functions of the protocol stack requested by the communication standard. For doing so, the control unit 1530 may include at least one processor or microprocessor, or may be a part of a processor. In addition, a part of the communication unit 1510 and the control unit 1530 may be referred to as a communication processor (CP). According to various embodiments, the control unit 1530 may control the terminal to carry out operations according to the various embodiments described above.

According to various embodiments of the disclosure, a method performed by a BS may include transmitting system information including network slice related information, receiving an RRC connection complete message including S-NSSAI, from a UE, and transmitting an RRC connection release message including priority information related to the S-NSSAI, to the UE.

According to various embodiments of the disclosure, a BS may include a transceiver and at least one processor operatively connected with the transceiver, and the at least one processor may be configured to transmit system information including network slice related information, receive an RRC connection complete message including S-NSSAI, from a UE, and transmit an RRC connection release message including priority information related to the S-NSSAI, to the UE.

A method and an apparatus according to various embodiments of the disclosure may efficiently perform cell selection or reselection of a UE, through system information broadcast in a wireless communication system.

A method and an apparatus according to various embodiments of the disclosure may efficiently perform cell selection or reselection of a UE, through information related to network slice which provides an intended service in a wireless communication system.

A method and an apparatus according to various embodiments of the disclosure may efficiently perform cell selection or reselection of a UE, through a timer in a wireless communication system.

Besides, effects obtainable from the disclosure are not limited to the above-mentioned effects, and other effects which are not mentioned may be clearly understood by those skilled in the art of the disclosure through the following descriptions.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining some or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the elements included in the disclosure are expressed in a singular or plural form. However, the singular or plural expression is appropriately selected according to a proposed situation for the convenience of explanation, the disclosure is not limited to a single element or a plurality of elements, the elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, comprising:
    receiving, from a base station (BS), first system information including a first slice specific cell reselection priority information;
    receiving, from the BS, a second system information including a first frequency specific cell reselection priority information;
    transmitting, to the BS, a radio resource control (RRC) setup request message;
    receiving, from the BS, a RRC setup message;
    transmitting, to the BS, a RRC setup complete message including a slice list information for a network slice selection;
    receiving, from the BS, a RRC release message including information on cell reselection, wherein the information on cell reselection includes a second slice specific cell reselection priority information and a second frequency specific cell reselection priority information;
    storing the second slice specific cell reselection priority information and the second frequency specific cell reselection priority information;
    in case that a value of a timer associated with the cell reselection is included in the RRC release message, starting the timer, performing the cell reselection based on the second slice specific cell reselection priority information and the second frequency specific cell reselection priority information while the timer is running; and
    in case that the timer is expired, discarding the second slice specific cell reselection priority information and the second frequency specific cell reselection priority information and applying the first slice specific priority information and first frequency specific cell reselection priority information for performing the cell reselection.

2. The method of claim 1,
    wherein the second system information is one of system information 2, system information 4, and system information 5.

3. A method performed by a base station (BS) in a wireless communication system, comprising:
    transmitting, to a user equipment (UE), first system information including a first slice specific cell reselection priority information;
    transmitting, to the UE, a second system information including a first frequency specific cell reselection priority information;
    receiving. from the UE, a radio resource control (RRC) setup request message;
    transmitting, to the UE, a RRC setup message;
    receiving, from the UE, a RRC setup complete message including a slice list information for a network slice selection; and
    transmitting, to the UE, a radio resource control (RRC) RRC release message including information on cell reselection,
    wherein the information on cell reselection includes a second slice specific cell reselection priority and a value of a timer associated with the cell reselection and a second frequency specific cell reselection priority information,
    wherein the second slice specific cell reselection priority information and the second frequency specific cell reselection priority information are applied for a cell reselection procedure while the timer is running, and
    wherein the second slice specific cell reselection priority information and the second frequency specific cell reselection priority information are discarded and the first slice specific cell reselection priority information and first frequency specific cell reselection priority information are applied for performing cell reselection in case that the timer is expired.

4. The method of claim 3,
    wherein the second system information is one of system information 2, system information 4, and system information 5.

5. A user equipment (UE) in a wireless communication system, comprising:
    a transceiver; and
    at least one processor coupled to the transceiver, wherein the at least one processor is configured to:

receive, from a base station (BS), first system information including a first slice specific cell reselection priority information, receive, from the BS, a second system information including a first frequency specific cell reselection priority information, transmit, to the BS, a radio resource control (RRC) setup request message, receive, from the BS, a RRC setup message, transmit, to the BS, a RRC setup complete message including a slice list information for a network slice selection, receive, from the BS, a RRC release message including information on cell reselection, wherein the information on cell reselection includes a second slice specific cell reselection priority information and a second frequency specific cell reselection priority information, store the second slice specific cell reselection priority information and the second frequency specific cell reselection priority information, in case that a value of a timer associated with the cell reselection is included in the RRC release message, start the timer, perform the cell reselection based on the second slice specific cell reselection priority information and the second frequency specific cell reselection priority information while the timer is running, and in case that the timer is expired, discard the second slice specific cell reselection priority information and the second frequency specific cell reselection priority information and apply the first slice specific priority information and first frequency specific cell reselection priority information for performing the cell reselection.

6. The UE of claim 5,
wherein the second system information is one of system information 2, system information 4, and system information 5.

7. A base station (BS) in a wireless communication system, comprising:
a transceiver; and
at least one processor coupled to the transceiver, wherein the at least one processor is configured to:
transmit, to a user equipment (UE), first system information including a first slice specific cell reselection priority,
transmit, to the UE, a second system information including a first frequency specific cell reselection priority information,
receive, from the UE, a radio resource control (RRC) setup request message,
transmit, to the UE, a RRC setup message,
receive, from the UE, a RRC setup complete message including a slice list information for a network slice selection, and
transmit, to the UE, a RRC release message including information on cell reselection,
wherein the information on cell reselection includes a second slice specific cell reselection priority and a value of a timer associated with the cell reselection and a second frequency specific cell reselection priority information,
wherein the second slice specific cell reselection priority information and the second frequency specific cell reselection priority information are applied for a cell reselection procedure while the timer is running, and
wherein the second slice specific cell reselection priority information and the second frequency specific cell reselection priority information are discarded and the first slice specific cell reselection priority information and first frequency specific cell reselection priority information are applied for performing cell reselection in case that the timer is expired.

8. The BS of claim 7,
wherein the second system information is one of system information 2, system information 4, and system information 5.

* * * * *